(12) United States Patent
Kaule et al.

(10) Patent No.: US 8,149,511 B2
(45) Date of Patent: Apr. 3, 2012

(54) SECURITY ELEMENT

(75) Inventors: Wittich Kaule, Emmering (DE); Wolfgang Rauscher, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 960 days.

(21) Appl. No.: 12/097,834

(22) PCT Filed: Dec. 21, 2006

(86) PCT No.: PCT/EP2006/012374
§ 371 (c)(1),
(2), (4) Date: Jun. 17, 2008

(87) PCT Pub. No.: WO2007/076952
PCT Pub. Date: Jul. 12, 2007

(65) Prior Publication Data
US 2009/0008923 A1    Jan. 8, 2009

(30) Foreign Application Priority Data
Dec. 23, 2005    (DE) .......................... 10 2005 062 132

(51) Int. Cl.
G02B 27/10    (2006.01)
(52) U.S. Cl. ........................................ 359/619; 359/626
(58) Field of Classification Search .................. 359/619, 359/626
See application file for complete search history.

(56) References Cited

U.S. PATENT DOCUMENTS

| | | | |
|---|---|---|---|
| 4,892,336 A | 1/1990 | Kaule et al. | |
| 5,712,731 A | 1/1998 | Drinkwater et al. | |
| 7,333,268 B2 * | 2/2008 | Steenblik et al. | 359/619 |
| 2003/0193183 A1 | 10/2003 | Taylor et al. | |
| 2005/0104364 A1 | 5/2005 | Keller et al. | |
| 2005/0170259 A1 | 8/2005 | Holmes | |
| 2005/0180020 A1 | 8/2005 | Steenblik et al. | |
| 2007/0165182 A1 | 7/2007 | Hoffmuller | |
| 2007/0211238 A1 | 9/2007 | Hoffmuller | |
| 2007/0216518 A1 | 9/2007 | Hoffmuller | |
| 2007/0229928 A1 | 10/2007 | Hoffmuller | |

(Continued)

FOREIGN PATENT DOCUMENTS

DE    10044465    3/2002

(Continued)

OTHER PUBLICATIONS

Hutley M.C. et al., "The moire magnifier," Pure Appl. Opt. 3:133-142, 1994.

(Continued)

*Primary Examiner* — William Choi
(74) *Attorney, Agent, or Firm* — Greenlee Sullivan P.C.

(57) ABSTRACT

The present invention relates to a security element (20) for security papers, value documents and the like, having a micro-optical moiré magnification arrangement having a motif image that consists of a periodic or at least locally periodic arrangement of a plurality of micromotif elements (28) that is planar or applied on a curved surface, and a periodic or at least locally periodic arrangement of a plurality of microfocusing elements (24) that is planar or applied on a curved surface, for moiré-magnified viewing of the micromotif elements (28) of the motif image, the arrangement of micromotif elements (28) and/or the arrangement of microfocusing elements (24) exhibiting, in the planar case, no symmetry axis in the plane of the arrangement in its periodic or at least locally periodic regions.

46 Claims, 18 Drawing Sheets

U.S. PATENT DOCUMENTS

Figure 1:
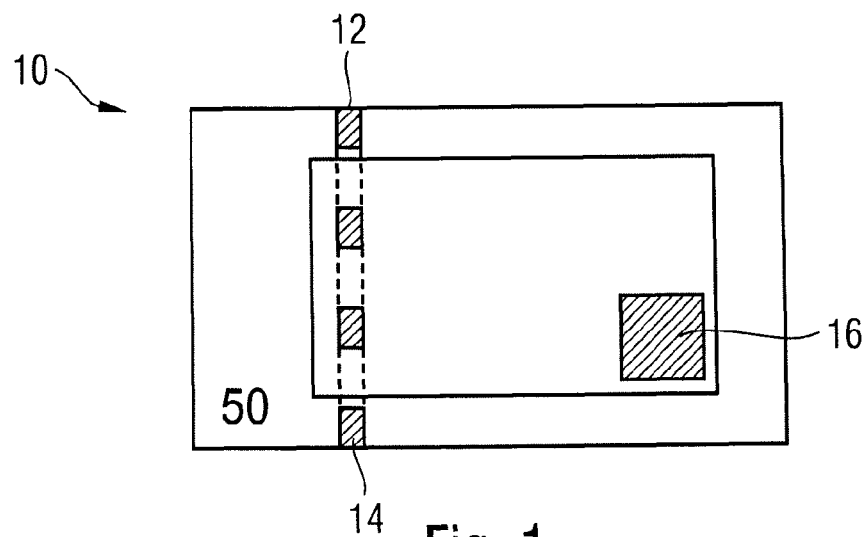

| | | |
|---|---|---|
| 2007/0241551 A1 | 10/2007 | Graff |
| 2007/0241553 A1 | 10/2007 | Heim |
| 2007/0246933 A1 | 10/2007 | Heim |
| 2007/0274559 A1 | 11/2007 | Depta |
| 2008/0014378 A1 | 1/2008 | Hoffmuller |
| 2008/0054621 A1 | 3/2008 | Burchard |
| 2008/0079257 A1 | 4/2008 | Fessl |
| 2008/0088859 A1 | 4/2008 | Depta |
| 2008/0160226 A1 | 7/2008 | Kaule |
| 2008/0163994 A1 | 7/2008 | Hoppe |
| 2008/0198468 A1 | 8/2008 | Kaule |
| 2008/0216976 A1 | 9/2008 | Ruck |
| 2008/0250954 A1 | 10/2008 | Depta |
| 2008/0258456 A1 | 10/2008 | Rahm |

FOREIGN PATENT DOCUMENTS

| | | |
|---|---|---|
| DE | 10226114 | 7/2003 |
| DE | 10308305 | 9/2004 |
| EP | 0238043 | 9/1987 |
| EP | 0064067 | 8/1988 |
| EP | 0330733 | 9/1989 |
| WO | WO 94/27254 | 11/1994 |
| WO | WO 99/13157 | 3/1999 |
| WO | WO 99/26793 | 6/1999 |
| WO | WO 02/101669 | 12/2002 |
| WO | WO 2005/052650 | 6/2005 |
| WO | WO 2005/106601 | 11/2005 |
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006040069 | 4/2006 |
| WO | WO 2006056342 | 6/2006 |
| WO | WO 2006072380 | 7/2006 |
| WO | WO 2006/087138 | 8/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |

OTHER PUBLICATIONS

International Search Report, International Application No. PCT/EP2006/012374, 4 pages, Sep. 17, 2007.
International Preliminary Report on Patentability, International Application No. PCT/EP2006/012374, 11 pages.
International Search Report, International Application No. PCT/EP2006/001169, 4 pages, Jun. 30, 2006.
International Preliminary Report on Patentability, International Application No. PCT/EP2006/001169, 5 pages.
U.S. Appl. No. 11/568,538, filed Sep. 23, 2008, Depta.
U.S. Appl. No. 11/719,843, Kaule.
U.S. Appl. No. 11/909,115, filed Sep. 19, 2007, Kretschmar.
U.S. Appl. No. 11/995,227, Gruszczynski.
U.S. Appl. No. 12/097,834, filed Jun. 17, 2008, Kaule.
U.S. Appl. No. 12/294,222, Hoffmuller.

* cited by examiner

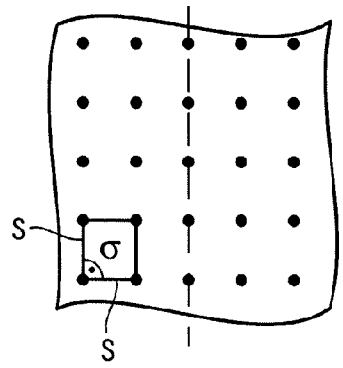
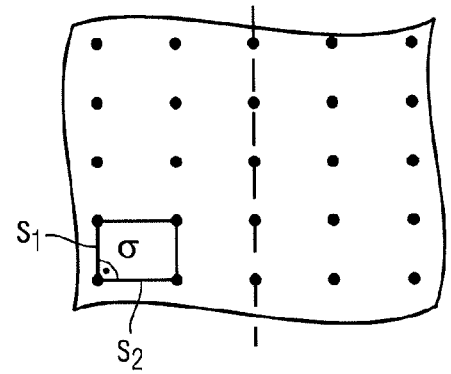
Fig. 4a                    Fig. 4b
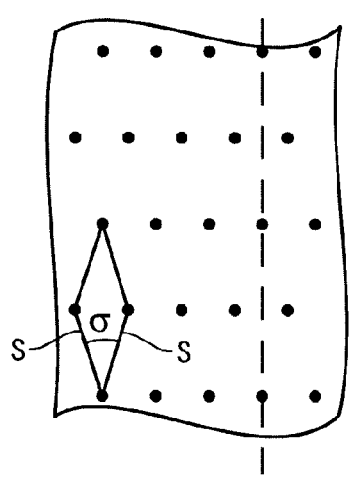
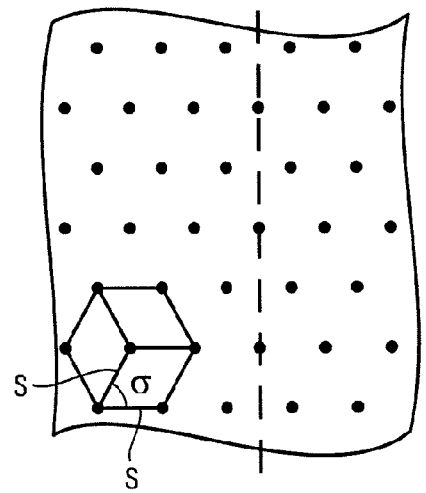
Fig. 4c                    Fig. 4d

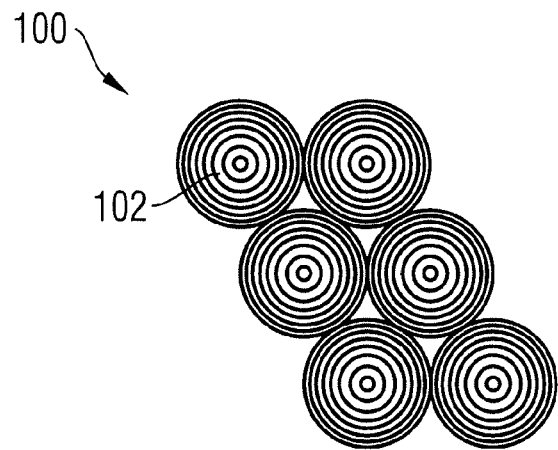
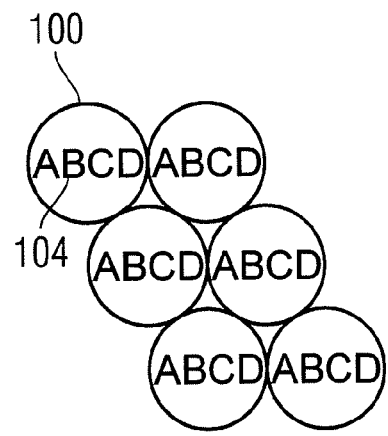
Fig. 9a    Fig. 9b
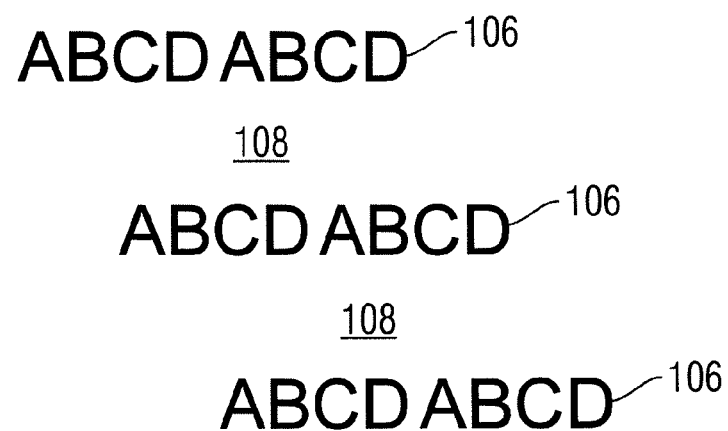
Fig. 9c

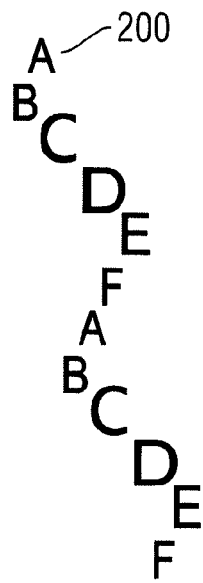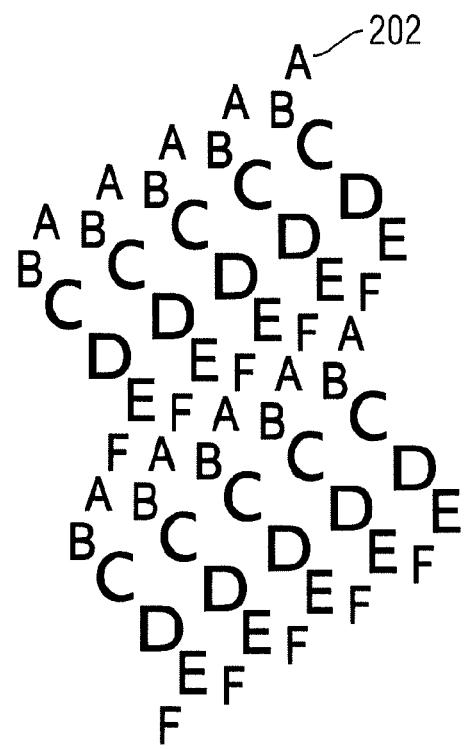
Fig. 17a    Fig. 17b
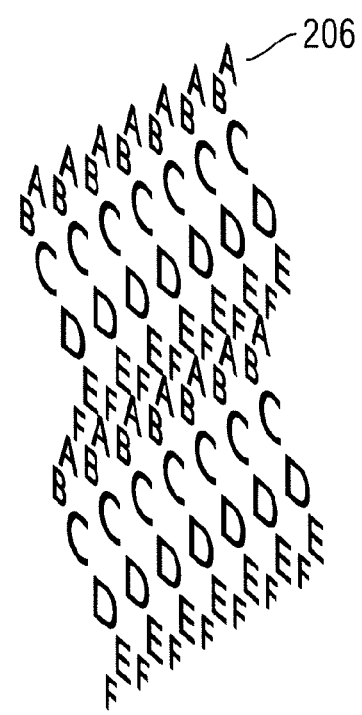
Fig. 18a    Fig. 18b

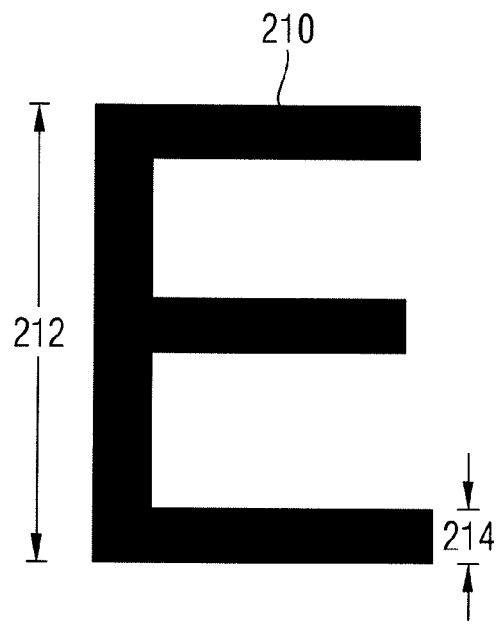
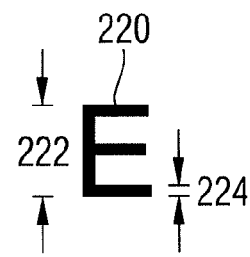
Fig. 19b
Fig. 19a
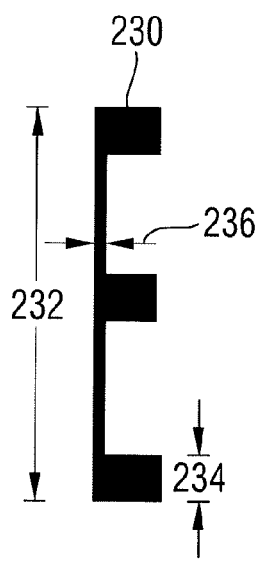
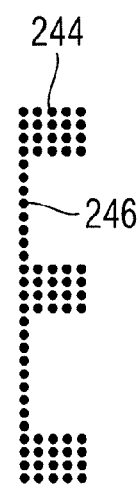
Fig. 19c                Fig. 19d                Fig. 19e

SECURITY ELEMENT

CROSS-REFERENCE TO RELATED APPLICATIONS

This application is the U.S. National Stage of International Application No. PCT/EP2006/012374, filed Dec. 21, 2006, which claims the benefit of German Patent Application DE 10 2005 062 132.5, filed Dec. 23, 2005; both of which are hereby incorporated by reference to the extent not inconsistent with the disclosure herewith.

The present invention relates to a security element for security papers, value documents and the like, and especially relates to such a security element having a micro-optical moiré magnification arrangement. The present invention further relates to a method for manufacturing such a security element, a security paper and a data carrier having such a security element.

For protection, data carriers, such as value or identification documents, or also other valuable articles, such as branded articles, are often provided with security elements that permit the authenticity of the data carrier to be verified, and that simultaneously serve as protection against unauthorized reproduction. Data carriers within the meaning of the present invention include especially banknotes, stocks, bonds, certificates, vouchers, checks, valuable admission tickets and other papers that are at risk of counterfeiting, such as passports and other identity documents, as well as product protection elements, such as labels, seals, packaging and the like. In the following, the term "data carrier" encompasses all such articles, documents and product protection means. In the following, the term "security paper" is understood to be the not-yet-circulatable precursor to a value document, which precursor is typically present in quasi-endless form and is further processed at a later time.

The security elements can be developed, for example, in the form of a security thread embedded in a banknote, a tear strip for product packaging, an applied security strip or a self-supporting transfer element, such as a patch or a label that, after its manufacture, is applied to a value document.

To prevent reproduction of the security elements even with top-quality color copiers, they often exhibit optically variable elements that, from different viewing angles, convey to the viewer a different image impression and show, for example, a different color impression or different graphic motifs. For this purpose, the security elements are furnished, for example, with security features in the form of micro- or nanopatterns having a diffraction optical effect, such as with conventional embossed holograms or other hologram-like diffraction patterns. Such diffraction optical patterns for security elements are described, for instance, in the publications EP 0 330 733 A1 and EP 0 064 067 A1.

Since recent years, however, holograms and hologram-like diffraction patterns are increasingly being used not only as security features, but also purely decoratively in non-security-critical applications, such that viewer awareness for holograms used as security features is diminishing. In many cases, the characteristic visual effect is no longer perceived by viewers as a security feature, but rather merely as a design variant, thus reducing the utility of these security features for protection against counterfeiting. Furthermore, the diffraction-optically produced image or color impressions can often be perceived completely and sharply only from certain viewing directions and under good lighting conditions. Particularly under poor lighting conditions, such as under diffuse illumination, the perceptibility of holographic motifs is often greatly restricted.

It is further known to employ lens systems as security features. For example, in publication EP 0 238 043 A2 is described a security thread composed of a transparent material on whose surface a grating composed of multiple parallel cylindrical lenses is embossed. Here, the thickness of the security thread is chosen such that it corresponds approximately to the focal length of the cylindrical lenses. On the opposing surface, a printed image is applied in perfect register, the printed image being designed taking into account the optical properties of the cylindrical lenses. Due to the focusing effect of the cylindrical lenses and the position of the printed image in the focal plane, depending on the viewing angle, different sub-areas of the printed image are visible. In this way, through appropriate design of the printed image, pieces of information can be introduced that are, however, visible only from certain viewing angles.

Through the appropriate development of the printed image, also "moving" pictures can be created. However, when the document is turned about an axis that runs parallel to the cylindrical lenses, the motif moves only approximately continuously from one location on the security thread to another location. In this application, not only is the application of cylindrical lens grids disclosed, but also the application of grids having spherical lenses and having a honeycomb lens arrangement to produce moving images.

From publication WO 94/27254 is known the use of a moiré magnification arrangement as a security feature. The security device described there exhibits a regular arrangement of substantially identical printed microimages having a size up to 250 μm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. As with every pair of similar grids, a moiré pattern results, the "moiré" in this case appearing in the form of magnified and/or rotated images of the repeated elements of the image grid.

However, the known moiré magnification arrangements can be counterfeited relatively easily by imprinting the patterns or by reproduction. Based on that, the object of the present invention is to specify a generic security element that avoids the disadvantages of the background art and that especially exhibits high counterfeit security. Furthermore, it is intended to specify a method for manufacturing such security elements.

This object is solved by the security element having the features of the independent claims. Various methods for manufacturing such a security element, a security paper and a data carrier having such a security element are specified in the coordinated claims. Developments of the present invention are the subject of the dependent claims.

According to an advantageous variant of the present invention, a generic security element includes a micro-optical moiré magnification arrangement having
- a motif image that consists of a periodic or at least locally periodic arrangement of a plurality of micromotif elements that is planar or applied on a curved surface, and
- a periodic or at least locally periodic arrangement of a plurality of microfocusing elements that is planar or applied on a curved surface for moiré-magnified viewing of the micromotif elements of the motif image,
- the arrangement of micromotif elements and/or the arrangement of microfocusing elements exhibiting, in the planar case, no symmetry axis in the plane of the arrangement in its periodic or at least locally periodic regions.

The following embodiments focus initially on planar moiré magnification arrangements. The special characteristics of curved moiré magnification arrangements are treated in detail further below.

The inventive use of a micromotif element arrangement or a microfocusing element arrangement having low symmetry offers multiple advantages compared with the use of higher-symmetry arrangements. For one thing, such a moiré magnification arrangement is very difficult to imitate since, for a correct image to be created when viewed, the very difficult-to-analyze low symmetry of the arrangement must be reproduced exactly.

Further, the low symmetry creates great freedom for differently chosen lattice parameters that can thus be used as a hidden identifier for protected products according to the present invention without this being, for a viewer, easily perceptible in the moiré-magnified image. On the other hand, all attractive effects that are realizable with higher-symmetry moiré magnification arrangements can also be realized with the low-symmetry moiré magnification arrangements according to the present invention.

Here, in a preferred variant of the present invention, both the plurality of micromotif elements and the plurality of microfocusing elements are arranged periodically. Here, the periodicity length is especially between 3 μm and 50 μm, preferably between 5 μm and 30 μm, particularly preferably between about 10 μm and about 20 μm.

Advantageously, both the arrangement of micromotif elements and the arrangement of microfocusing elements each forms a two-dimensional Bravais lattice, at least the arrangement of micromotif elements forming a Bravais lattice having the symmetry of a parallelogram lattice. As described in detail below, all periodic planar arrangements can be allocated to one of five basic Bravais lattices, the Bravais lattice having the highest symmetry being chosen for unambiguous allocation. Thus, if a lattice has the symmetry of a parallelogram lattice, then this means that the lattice exhibits no higher symmetry than that of the general parallelogram lattice since, if a higher symmetry were present, it would be allocated to the corresponding higher-symmetry Bravais lattice type.

The lattice cells of the two Bravais lattices are expediently described by a first side length $s_1$, a second side length $s_2$ and an angle σ in between, the parallelogram lattice of the micromotif elements differing from the Bravais lattice of the microfocusing elements especially in at least one of the lattice parameters $s_1$, $s_2$ and σ by 0.01% to 5%, preferably by 0.1% to 2%. The fact that the arrangement of the micromotif elements forms a Bravais lattice having the symmetry of a parallelogram lattice means, expressed by the lattice parameters, that, independently of the specific choice of lattice cells, $s_1$ is not equal to $s_2$ (otherwise a rhombic lattice, a hexagonal lattice or a square lattice would be present, depending on the angle in between) and that the angle σ in between is not equal to 90° (otherwise a rectangular lattice would be present).

Alternatively, or additionally, it can be provided that the arrangement of microfocusing elements forms a Bravais lattice having the symmetry of a parallelogram lattice. In this case, too, the lattice cells of the two Bravais lattices are expediently described by a first side length $s_1$, a second side length $s_2$ and an angle σ in between, the parallelogram lattice of the microfocusing elements differing from the Bravais lattice of the micromotif elements in at least one of the lattice parameters $s_1$, $s_2$ and σ by 0.01% to 5%, preferably by 0.1% to 2%.

In another, likewise preferred variant of the present invention, locally, both the plurality of micromotif elements and the plurality of microfocusing elements are arranged periodically, the local period parameters changing only slowly in relation to the periodicity length. For example, the local period parameters can be periodically modulated across the expanse of the security element, the modulation period being especially at least 20 times, preferably at least 50 times, particularly preferably at least 100 times greater than the local periodicity length. Such a slow change of the local period parameters does not affect the above fundamental statements about the low symmetry of the arrangements in the embodiments according to the present invention. Due to the slow change of the period parameters, locally, the two micro-arrangements can always be described with sufficient precision by Bravais lattices having constant lattice parameters that, in accordance with the present invention, each meet the specified condition of exhibiting no symmetry axis in the plane of the arrangement.

In this variant of the present invention, too, the local periodicity length is especially between 3 μm and 50 μm, preferably between 5 μm and 30 μm, particularly preferably between about 10 μm and about 20 μm.

In analogy to the first variant of the present invention, both the arrangement of micromotif elements and the arrangement of microfocusing elements each forms, locally, a two-dimensional Bravais lattice, at least the arrangement of micromotif elements forming, locally, a Bravais lattice having the symmetry of a parallelogram lattice. Locally, the lattice cells of the two Bravais lattices are expediently each described by a first side length $s_1$, a second side length $s_2$ and an angle σ in between, the parallelogram lattice of the micromotif elements differing from the Bravais lattice of the microfocusing elements especially in at least one of the lattice parameters $s_1$, $s_2$ and σ by 0.01% to 5%, preferably by 0.1% to 2%.

Alternatively, or additionally, it can be provided that, locally, the arrangement of microfocusing elements forms a Bravais lattice having the symmetry of a parallelogram lattice. Here, too, locally, the lattice cells of the two Bravais lattices are expediently each described by a first side length $s_1$, a second side length $s_2$ and an angle σ in between, the parallelogram lattice of the microfocusing elements differing from the Bravais lattice of the micromotif elements especially in at least one of the lattice parameters $s_1$, $s_2$ and a by 0.01% to 5%, preferably by 0.1% to 2%.

The microfocusing elements of the moiré magnification arrangement can be present as transmissive, refractive or diffractive lenses or a hybrid form. In preferred embodiments, they are formed by cylindrical or non-cylindrical microlenses, especially also by microlenses having a circular or polygonally delimited base area.

In a further aspect, the present invention includes a generic security element having a micro-optical moiré magnification arrangement having a motif image that consists of a periodic or at least locally periodic arrangement of a plurality of micromotif elements that is planar or applied on a curved surface, and a periodic or at least locally periodic arrangement of a plurality of microfocusing elements that is planar or applied on a curved surface for moiré-magnified viewing of the micromotif elements of the motif image, the arrangement of micromotif elements and/or the arrangement of microfocusing elements being formed by elongated micromotif elements or microfocusing elements whose dimension in the longitudinal direction is at least 5 times greater, preferably 6 times greater, particularly preferably even 10 times greater or even greater still than the dimension in the transverse direction perpendicular to the longitudinal direction.

Here, the micromotif elements are preferably formed by elongated motif elements whose dimension in the longitudinal direction measures more than 250 µm, preferably more than 300 µm, particularly preferably more than 500 µm and especially more than 1 mm. The dimension of the micromotif elements in the transverse direction is preferably between 5 µm and 50 µm, preferably between 10 µm and 30 µm.

In an advantageous variant of this aspect of the present invention, the expansive, elongated motif elements are combined with normal microfocusing elements, especially with microlenses having a circular or polygonally delimited base area. An advantageous approach when calculating the appearance of the elongated micromotif images from a desired visible image, a desired movement behavior and a specified lens grid is described in detail below.

In another, likewise advantageous variant of this aspect of the present invention, the microfocusing elements are formed by elongated cylindrical lenses whose dimension in the longitudinal direction measures more than 250 µm, preferably more than 300 µm, particularly preferably more than 500 µm and especially more than 1 mm. The dimension of the microfocusing elements in the transverse direction is preferably between 5 µm and 50 µm, preferably between 10 µm and 30 µm.

In a further aspect, the present invention includes a generic security element having a micro-optical moiré magnification arrangement having a motif image that consists of a periodic or at least locally periodic arrangement of a plurality of micromotif elements that is planar or applied on a curved surface, and a periodic or at least locally periodic arrangement of a plurality of microfocusing elements that is planar or applied on a curved surface for moiré-magnified viewing of the micromotif elements of the motif image, the magnified moiré image moving, when the security element is tilted, in a specified direction that, with the tilt direction, encloses an angle γ not equal to 0° and not equal to 90°.

The specified direction preferably encloses, with the tilt direction, an angle γ between 5° and 85°, especially between 10° and 80°, between 20° and 70° or between 30° and 60°.

In a preferred embodiment, the arrangement of micromotif elements and the arrangement of microfocusing elements each forms, at least locally, a two-dimensional Bravais lattice whose lattice cell vectors are given by $\vec{u}_i$ and $\vec{w}_i$, having the components $u_{1i}$, $u_{2i}$ and $w_{1i}$, $w_{2i}$, where i=1, 2. Here, the lattice of the micromotif elements and the lattice of the microfocusing elements are related thus:

$$\vec{U} = \vec{W} - \vec{A}^{-1} \cdot \vec{W},$$

the matrices $\vec{W}$, $\vec{U}$ and $\vec{A}$ being given by $$\vec{A} = \begin{pmatrix} a_{11} & a_{12} \\ a_{21} & a_{22} \end{pmatrix}, \vec{W} = \begin{pmatrix} w_{11} & w_{12} \\ w_{21} & w_{22} \end{pmatrix} \text{ and } \vec{U} = \begin{pmatrix} u_{11} & u_{12} \\ u_{21} & u_{22} \end{pmatrix}.$$

The matrix elements of the matrix $\vec{A}$ are chosen such that they are related to the specified movement direction through $$\tan\gamma_1 = \frac{a_{21}}{a_{11}}, \tan\gamma_2 = \frac{a_{22}}{a_{12}}$$

$\gamma_1$ representing the angle to horizontal at which the magnified moiré image moves when the security element is tilted laterally, and $\gamma_2$ representing the angle to horizontal at which the magnified moiré image moves when the security element is tilted forward and back.

According to a further aspect, the present invention includes a generic security element having a micro-optical moiré magnification arrangement having a motif image that consists of a periodic or at least locally periodic arrangement of a plurality of micromotif elements that is planar or applied on a curved surface, and a periodic or at least locally periodic arrangement of a plurality of microfocusing elements that is planar or applied on a curved surface for moiré-magnified viewing of the micromotif elements of the motif image, the arrangement of micromotif elements and the arrangement of microfocusing elements forming dissimilar lattices that are coordinated with each other in such a way that, when the security element is tilted, an orthoparallactic motion effect of the magnified moiré image appears.

In this aspect, the present invention is based on the idea that an orthoparallactic motion effect can be achieved not only with the aid of a motif grid and lens grid that are similar and twisted toward each other, but also through a motif grid and lens grid that are suitably distorted toward each other, or in other words dissimilar.

In a preferred embodiment, the arrangement of micromotif elements and the arrangement of microfocusing elements each forms, at least locally, a two-dimensional Bravais lattice whose lattice cell vectors are given by $\vec{u}_i$ and $\vec{w}_i$, having the components $u_{1i}$, $u_{2i}$ and $w_{1i}$, $w_{2i}$, where i=1, 2, and in which the lattice of the micromotif elements and the lattice of the microfocusing elements are related thus:

$$\vec{U} = \vec{W} - \vec{A}^{-1} \cdot \vec{W}$$

the matrices $\vec{W}$, $\vec{U}$ and $\vec{A}$ being given by $$\vec{A} = \begin{pmatrix} a_{11} & a_{12} \\ a_{21} & a_{22} \end{pmatrix}, \vec{W} = \begin{pmatrix} w_{11} & w_{12} \\ w_{21} & w_{22} \end{pmatrix} \text{ and } \vec{U} = \begin{pmatrix} u_{11} & u_{12} \\ u_{21} & u_{22} \end{pmatrix},$$

and $\vec{A}$ having the form $$\vec{A} = \begin{pmatrix} 0 & b \\ a & 0 \end{pmatrix} \text{ or } \vec{A} = \begin{pmatrix} 0 & -b \\ a & 0 \end{pmatrix} \text{ or } \vec{A} = \begin{pmatrix} 0 & b \\ -a & 0 \end{pmatrix} \text{ or } \vec{A} = \begin{pmatrix} 0 & -b \\ -a & 0 \end{pmatrix}$$

with real numbers a, b. Here, a, b>0 is preferably chosen.

In all cited variants of the present invention, the motif image and the arrangement of microfocusing elements can be arranged at opposing surfaces of an optical spacing layer. The spacing layer can comprise, for example, a plastic foil and/or a lacquer layer.

Furthermore, the arrangement of microfocusing elements can be provided with a protective layer whose refractive index preferably differs from the refractive index of the microfocusing elements by at least 0.3, in the event that refractive lenses serve as microfocusing elements. In this case, due to the protective layer, the focal length of the lenses changes, which must be taken into account when dimensioning the radii of curvature of the lenses and/or the thickness of the spacing layer. In addition to the protection against environmental effects, such a protective layer also prevents the microfocusing element arrangement from being easily molded for counterfeiting purposes. If the lens-shaped microfocusing elements are manufactured, for instance, from lacquers having a refractive index of 1.2 to 1.5, then, for example, as protective layers, lacquers filled with nanoparticles composed of titanium oxide are appropriate, which are commercially available having refractive indices between 1.7 and 2. In the event that the refractive index of the protective layer is greater than the refractive index of the lenses, then the lenses are present in concave form, and focusing elements form only in connection with the protective layer.

The total thickness of the security element is advantageously below 50 µm, which ensures that it is well suited for use in security paper, value documents and the like.

The micromotif elements are preferably present in the form of microcharacters or micropatterns. In particular, the micromotif elements can be present in a printing layer. It is understood that, to produce the moiré magnification effect, the micromotif elements must be largely identical. However, a slow, especially periodically modulated change of the appearance of the micromotif elements and thus also of the magnified images is likewise also within the scope of the present invention. Also, individual micromotif elements or a portion thereof can be furnished with additional pieces of information that do not appear in the magnified moiré image, but that can be used as additional authenticating marks.

The shape and arrangement of the microfocusing elements and the shape and arrangement of the micromotif elements are preferably coordinated with each other to prevent unused spaces in the magnified motif image. Here, there exists both the possibility to specify the micromotif elements and choose the shape and arrangement of the microfocusing elements accordingly, and the possibility to specify the microfocusing elements and adapt the shape and arrangement of the micromotif elements accordingly.

According to an advantageous development of the present invention, the security element further exhibits an opaque cover layer to cover the moiré magnification arrangement in some regions. Thus, within the covered region, no moiré magnification effect occurs, such that the optically variable effect can be combined with conventional pieces of information or with other effects. This cover layer is advantageously present in the form of patterns, characters or codes and/or exhibits gaps in the form of patterns, characters or codes. The cover layer expediently comprises a printing layer or a reflection layer, especially a metal layer. For example, gaps of the desired the shape and size can be introduced into a metal layer by means of the washing process described in publication WO 99/13157 A1 or another demetallization process.

The reflection layer can also be formed by other layers or sequences of layers, for instance by a reflective thin-layer element having a color-displacement effect. Such a thin-layer element expediently exhibits a reflection layer, an absorber layer and a dielectric spacing layer of suitable thickness arranged between the reflection layer and the absorber layer.

The security element itself preferably constitutes a security thread, a tear strip, a security band, a security strip, a patch or a label for application to a security paper, value document or the like. In an advantageous embodiment, the security element can span a transparent or uncovered region of a data carrier. Here, different appearances can be realized on different sides of the data carrier.

According to an advantageous development of the present invention, the element is designed for application on a curved surface. In a further, likewise advantageous variant of the present invention, the visual appearance of the moiré-magnified image changes when the security element is curved or bent. Here, it can especially be provided that i) a predefined moiré-magnified image motif is not visible in the planar state of the security element and appears when the security element is curved or bent, that ii) a predefined moiré-magnified image motif is visible in the planar state of the security element and disappears when the security element is curved or bent, that iii) a predefined moiré-magnified image motif is visible in the planar state of the security element and is supplemented by a further predefined image motif when the security element is curved or bent, or that iv) a first predefined moiré-magnified image motif is visible in the planar state of the security element and is replaced by a second predefined image motif when the security element is curved or bent.

The present invention also includes a method for manufacturing a security element having a micro-optical moiré magnification arrangement, in which a motif image that consists of a periodic or at least locally periodic arrangement of a plurality of micromotif elements that is planar or applied on a curved surface, and a periodic or at least locally periodic arrangement of a plurality of microfocusing elements that is planar or applied on a curved surface, are arranged in such a way that the micromotif elements are perceptible in magnification when viewed through the microfocusing elements, and the arrangement of micromotif elements and/or the arrangement of microfocusing elements being chosen such that they exhibit, in the planar case, no symmetry axis in the plane of the arrangement in their periodic or at least locally periodic regions.

Here, in a preferred development of the method, it is provided that
a) a desired image that is visible when viewed and has one or more moiré image elements is defined, the arrangement of magnified moiré image elements being chosen in the form of a two-dimensional Bravais lattice whose lattice cells are given by vectors $\vec{t}_1$ and $\vec{t}_2$,
b) an arrangement of microfocusing elements is chosen in the form of a two-dimensional Bravais lattice whose lattice cells are given by vectors $\vec{w}_1$ and $\vec{w}_2$,
c) the motif image having the micromotif elements is calculated using the relationships $$\vec{U} = \vec{W} \cdot (\vec{T} + \vec{W})^{-1} \cdot \vec{T}$$

and $$\vec{r} = \vec{W} \cdot (\vec{T} + \vec{W})^{-1} \cdot \vec{R} + \vec{r}_0$$

$$\vec{R} = \begin{pmatrix} X \\ Y \end{pmatrix}$$

representing an image point of the desired image, $$\vec{r} = \begin{pmatrix} x \\ y \end{pmatrix}$$

an image point of the motif image, $$\vec{r}_0 = \begin{pmatrix} x_0 \\ y_0 \end{pmatrix}$$

a displacement between the arrangement of microfocusing elements and the arrangement of micromotif elements, and the matrices $\vec{T}$, $\vec{W}$ and $\vec{U}$ being given by $$\vec{T} = \begin{pmatrix} t_{11} & t_{12} \\ t_{21} & t_{22} \end{pmatrix}, \vec{W} = \begin{pmatrix} w_{11} & w_{12} \\ w_{21} & w_{22} \end{pmatrix} \text{ and } \vec{U} = \begin{pmatrix} u_{11} & u_{12} \\ u_{21} & u_{22} \end{pmatrix},$$

with $t_{1i}$, $t_{2i}$, $u_{1i}$, $u_{2i}$ and $w_{1i}$, $w_{2i}$ representing the components of the lattice cell vectors $\vec{t}_i$, $\vec{u}_i$ and $\vec{w}_i$, where $i=1, 2$.

According to an advantageous variant of the present invention, the lattice parameters of the Bravais lattice are location independent. However, it is likewise possible to modulate the vectors $\vec{u}_1$ and $\vec{u}_2$, or $\vec{w}_1$ and $\vec{w}_2$ location dependently, the local period parameters $|\vec{u}_1|$, $|\vec{u}_2|$, $\angle(\vec{u}_1, \vec{u}_2)$ and $|\vec{w}_1|$, $|\vec{w}_2|$, $\angle(\vec{w}_1, \vec{w}_2)$ changing, according to the present invention, only slowly in relation to the periodicity length. In this way it is ensured that the arrangements can always be reasonably described by Bravais lattices.

In another, likewise preferred development of the method, it is provided that a) a desired image that is visible when viewed and has one or more moiré image elements is defined, b) an arrangement of microfocusing elements is chosen in the form of a two-dimensional Bravais lattice whose lattice cells are given by vectors $\vec{w}_1$ and $\vec{w}_2$, c) a desired movement of the visible image when the moiré magnification arrangement is tilted laterally and when tilted forward and back is defined, the desired movement being specified in the form of the matrix elements of a transformation matrix $\vec{A}$, and d) the motif image having the micromotif elements is calculated using the relationships $$\vec{U} = (\vec{I} - \vec{A}^{-1}) \cdot \vec{W}$$

and $$\vec{r} = \vec{A}^{-1} \cdot \vec{R} + \vec{r}_0$$

$$\vec{R} = \begin{pmatrix} X \\ Y \end{pmatrix}$$

representing an image point of the desired image, $$\vec{r} = \begin{pmatrix} x \\ y \end{pmatrix}$$

an image point of the motif image, $$\vec{r}_0 = \begin{pmatrix} x_0 \\ y_0 \end{pmatrix}$$

a displacement between the arrangement of microfocusing elements and the arrangement of micromotif elements, and the matrices $\vec{A}$, $\vec{W}$ and $\vec{U}$ being given by $$\vec{A} = \begin{pmatrix} a_{11} & a_{12} \\ a_{21} & a_{22} \end{pmatrix}, \vec{W} = \begin{pmatrix} w_{11} & w_{12} \\ w_{21} & w_{22} \end{pmatrix} \text{ and } \vec{U} = \begin{pmatrix} u_{11} & u_{12} \\ u_{21} & u_{22} \end{pmatrix},$$

with $u_{1i}$, $u_{2i}$ and $w_{1i}$, $w_{2i}$ representing the components of the lattice cell vectors $\vec{u}_i$ and $\vec{w}_i$, where $i=1, 2$.

For the embodiments following now, especially with reference to moiré magnifiers having cylindrical lenses and curved moiré magnifiers, the grid matrices are also written without a double arrow when it is clear from the context that they are matrices.

In a further aspect, the present invention also provides a method for manufacturing a security element having a micro-optical moiré magnification arrangement, in which a motif image that consists of a periodic or at least locally periodic arrangement of a plurality of micromotif elements that is planar or applied on a curved surface, and a periodic or at least locally periodic arrangement of a plurality of microfocusing elements that is planar or applied on a curved surface, are arranged in such a way that the micromotif elements are perceptible in magnification when viewed through the microfocusing elements, and the arrangement of micromotif elements and/or the arrangement of microfocusing elements being formed by elongated micromotif elements or microfocusing elements whose dimension in the longitudinal direction is at least 5 times greater, preferably 6 times greater, particularly preferably even 10 times greater or even greater still than the dimension in the transverse direction perpendicular to the longitudinal direction.

Here, in a preferred development, a) an arrangement of microfocusing elements is chosen in the form of a cylindrical lens grid having cylindrical lens spacing d and orientation of the lens grid $\phi$, b) a desired image that is visible when viewed and has one or more moiré image elements is defined, the arrangement of magnified moiré image elements being chosen in the form of a translation lattice having a translation vector $$\vec{t}_1 = \begin{pmatrix} t_{11} \\ t_{21} \end{pmatrix},$$

by which a desired movement direction $\vec{t}_1$ when the arrangement is tilted is defined, and c) the motif image is calculated using the relationships $$v = \frac{t_{11}}{u_{11}} = \frac{t_{21}}{u_{21}} = \frac{d}{d - u_{11}\cos\phi - u_{21}\sin\phi} = \frac{d + t_{11}\cos\phi + t_{21}\sin\phi}{d}$$

and $$\begin{pmatrix} x \\ y \end{pmatrix} = A^{-1} \begin{pmatrix} X \\ Y \end{pmatrix} = \frac{1}{d} \begin{pmatrix} d - u_{11}\cos\phi & -u_{11}\sin\phi \\ -u_{21}\cos\phi & d - u_{21}\sin\phi \end{pmatrix} \cdot \begin{pmatrix} X \\ Y \end{pmatrix}$$

$$\vec{R} = \begin{pmatrix} X \\ Y \end{pmatrix}$$

representing an image point of the desired image and $$\vec{r} = \begin{pmatrix} x \\ y \end{pmatrix}$$

an image point of the motif image.

As mentioned above, expansive, elongated motif elements can also be combined with normal microfocusing elements. For this, it is especially possible for a) a desired motif image that is visible when viewed to be defined, the visible image motif being described by image points $$\vec{R} = \begin{pmatrix} X \\ Y \end{pmatrix},$$

b) a translation repeat $$\vec{t}_1 = \begin{pmatrix} t_{11} \\ t_{21} \end{pmatrix}$$

to be defined, a desired movement direction $\psi$ when the arrangement is tilted being given by $\tan \psi = t_{21}/t_{11}$, c) an arrangement of microfocusing elements to be chosen in the form of a two-dimensional Bravais lattice whose lattice cells are given by vectors $\vec{w}_1$ and $\vec{w}_2$, d) the motif translation $$\vec{u}_1 = \begin{pmatrix} u_{11} \\ u_{21} \end{pmatrix}$$

of the micromotif elements to be calculated using the relationship $$v = \frac{t_{11}}{u_{11}} = \frac{t_{21}}{u_{21}} = \frac{w_{11}w_{22} - w_{12}w_{21}}{w_{11}w_{22} - w_{12}w_{21} + t_{11}w_{22} - w_{12}t_{21}},$$

e) the distortion matrix $A^{-1}$ to be calculated using the relationship $$A^{-1} = \frac{1}{\text{Det} W} \begin{pmatrix} \text{Det} W - u_{11}w_{22} & u_{11}w_{12} \\ -u_{21}w_{22} & \text{Det} W + u_{21}w_{12} \end{pmatrix}$$

where Det $W = w_{11}w_{22} - w_{12}w_{21}$, f) with the distortion matrix composed of the image points of the desired visible image motif, the image points of the micromotif element to be created to be calculated by $$\begin{pmatrix} x \\ y \end{pmatrix} = A^{-1} \begin{pmatrix} X \\ Y \end{pmatrix}, \text{ and}$$

g) the thus calculated micromotif element to be created to be arranged repeatedly displaced with the translation vector $$\vec{u}_1 = \begin{pmatrix} u_{11} \\ u_{21} \end{pmatrix}.$$

Here, in step b), the desired visible image motif (X,Y) and the moiré displacement $t_{11}$, $t_{21}$ resulting from the desired movement behavior are preferably coordinated with each other in such a way that overlaps are avoided. This can be done, for example, with the aid of a common drawing program.

According to a further advantageous development of the method, it is provided that a) an arrangement of microfocusing elements is chosen in the form of a two-dimensional Bravais lattice whose lattice cells are given by vectors $\vec{w}_1$ and $\vec{w}_2$, b) a predefined bending is defined for viewing in the case of a curved moiré magnification arrangement, the predefined bending being specified in the form of the matrix elements of the bending matrices for lens grids and motif grids $V_L$, $V_M$;

c) a desired movement and magnification behavior of the visible image is specified either prior to bending by a transformation matrix A or after bending by a transformation matrix A', and d) the motif image having the micromotif elements is calculated using the relationships $$\vec{U} = \vec{W} - \vec{A}^{-1} \cdot \vec{W}$$

and $$A' = (I - V_M(I - A^{-1})V_L^{-1})^{-1} \text{ or}$$
$$A = (I - V_M^{-1}(I - A'^{-1})V_L)^{-1}.$$

A security paper for manufacturing security or value documents, such as banknotes, checks, identification cards or the like, is preferably furnished with a security element of the kind described above. The security paper can especially comprise a carrier substrate composed of paper or plastic.

The present invention also includes a data carrier, especially a branded article, a value document or the like, having a security element of the kind described above. Here, the security element can especially be arranged in a window region, that is, a transparent or uncovered region of the data carrier.

Further exemplary embodiments and advantages of the present invention are described below with reference to the drawings. To improve clarity, a depiction to scale and proportion was dispensed with in the drawings.

Figure 2:
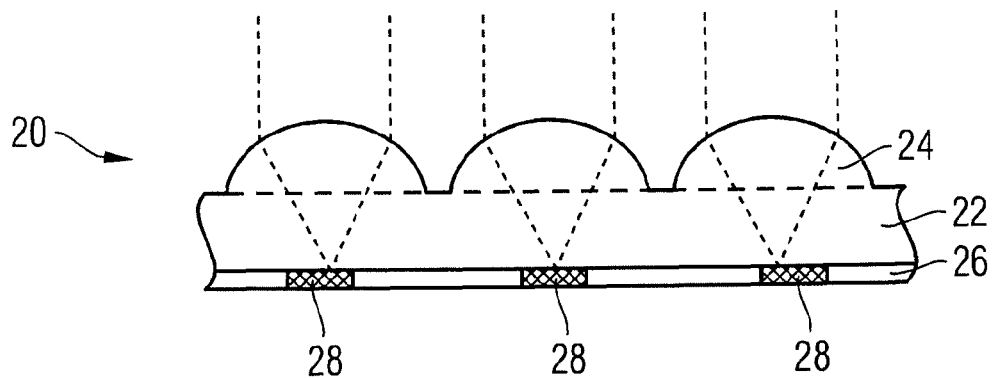
Figure 4E:
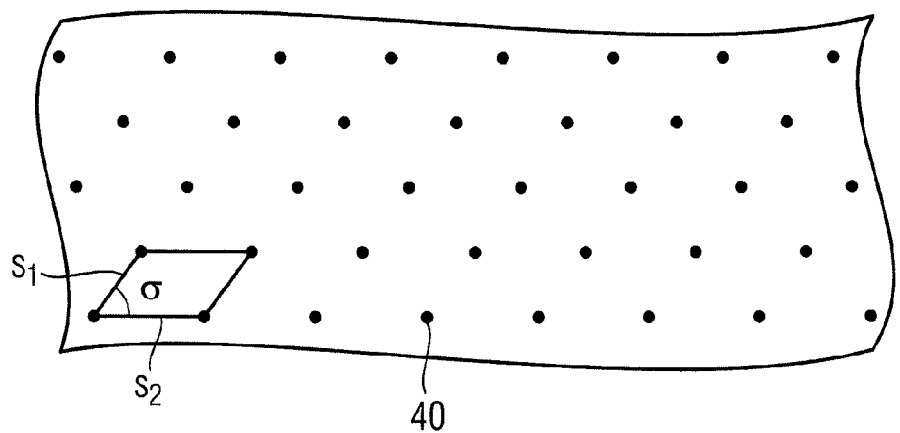
Figure 5:
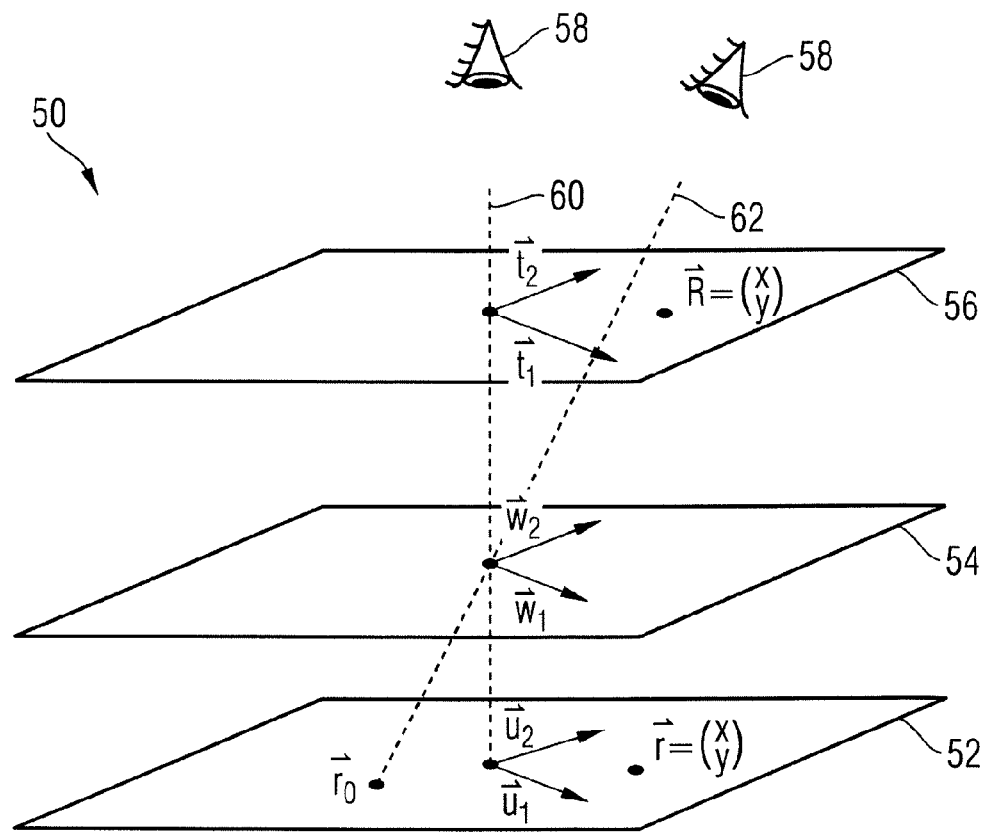
Figure 7A:
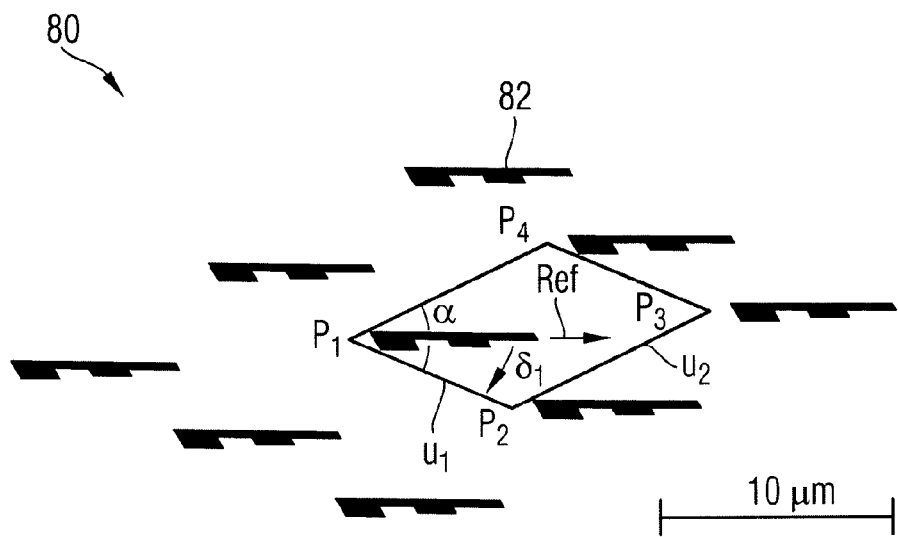
Figure 7B:
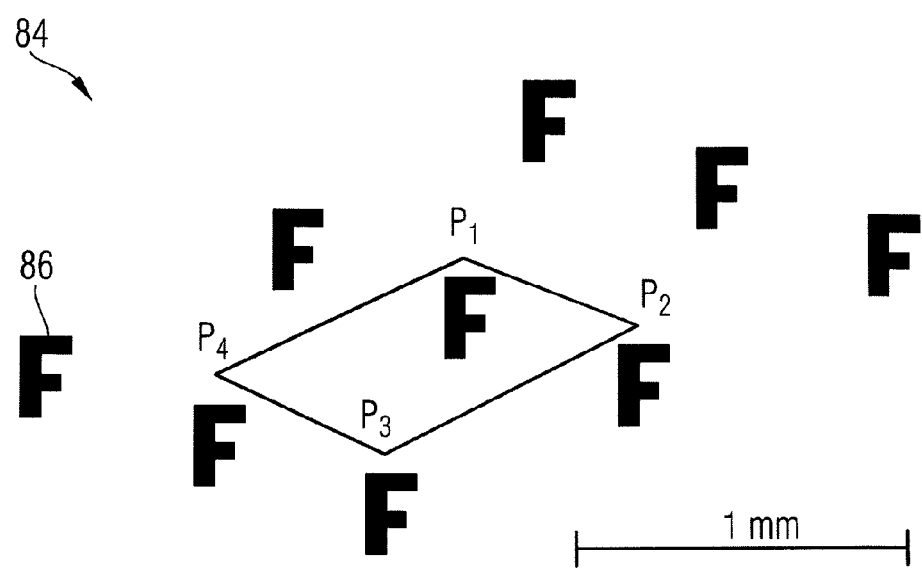
Figure 8A:
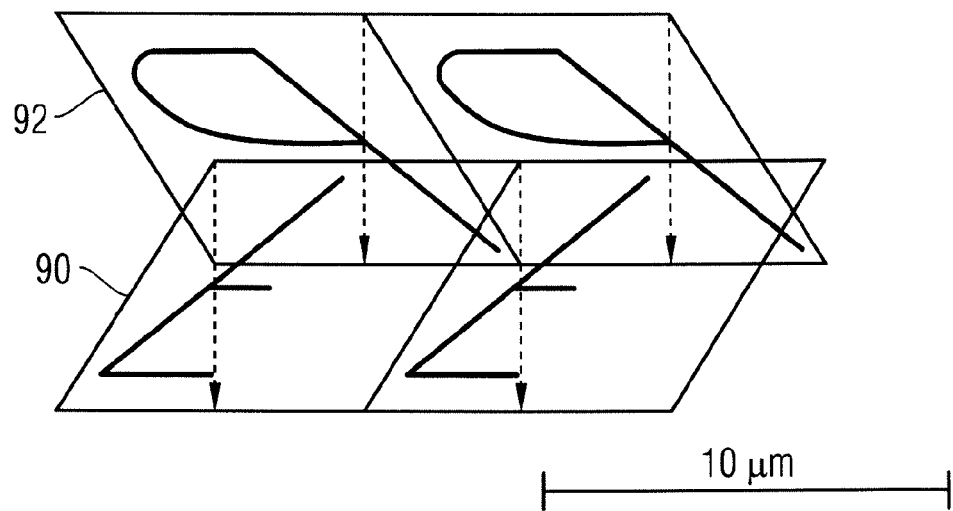
Figure 8B:
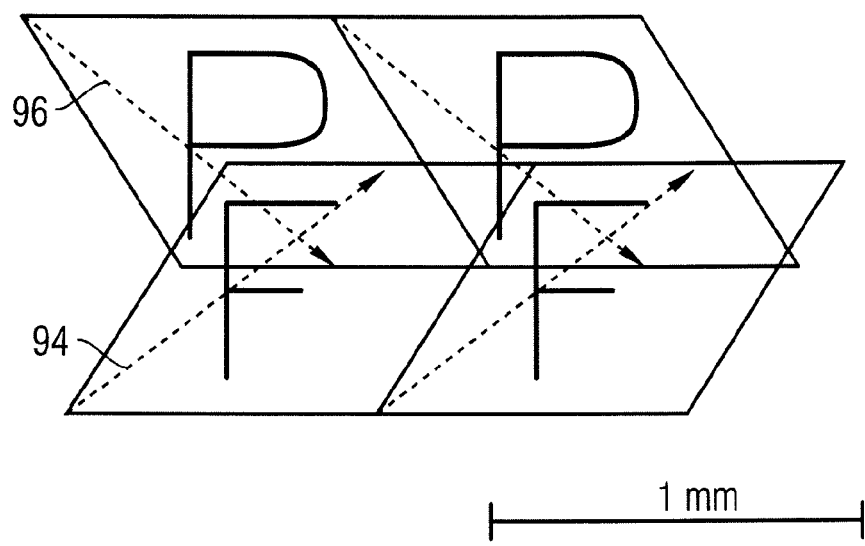
Figure 11A:
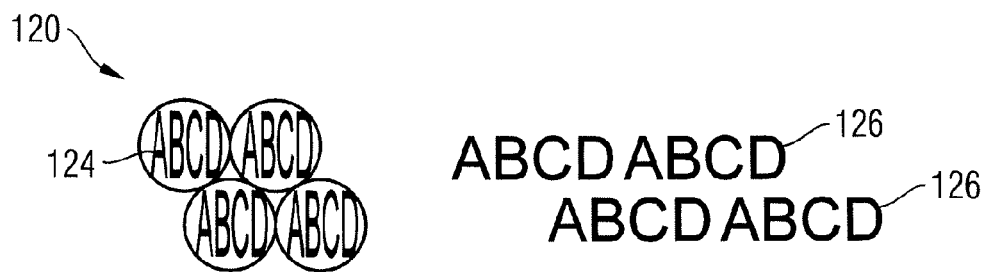
Figure 11B:
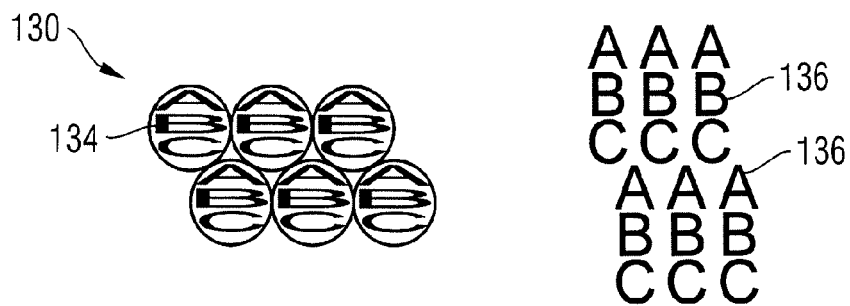
Figure 11C:
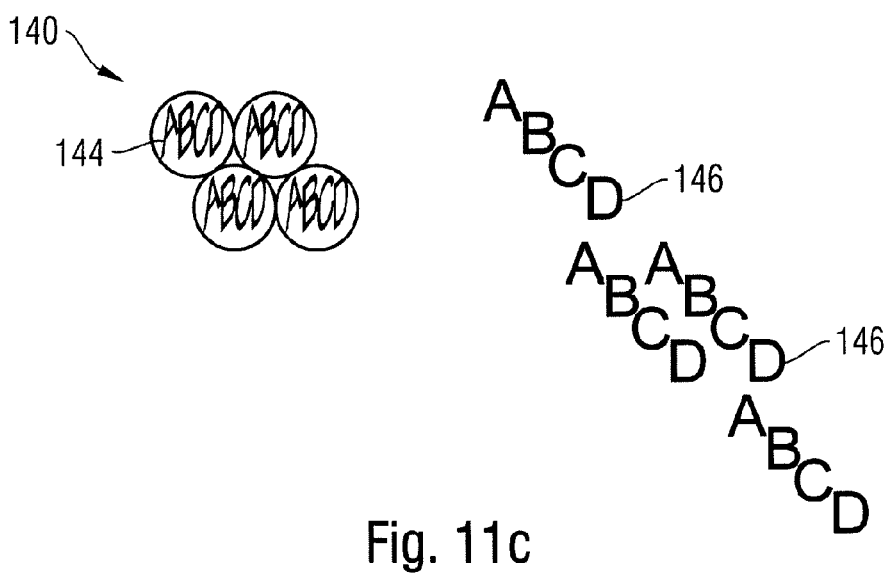
Figure 12A:
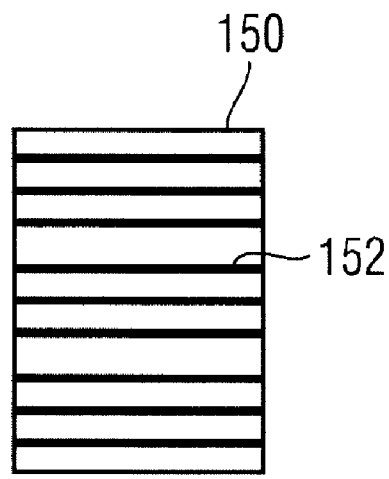
Figure 12B:
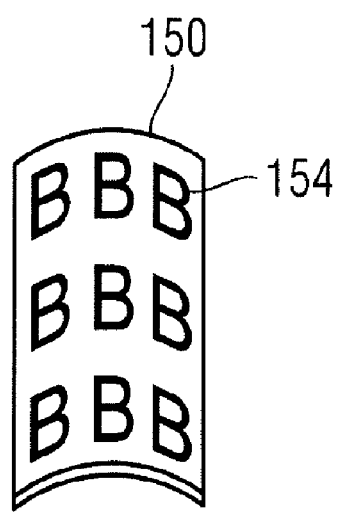
Figure 12C:
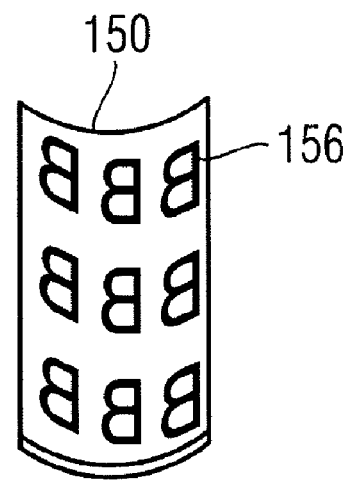
Figure 20:
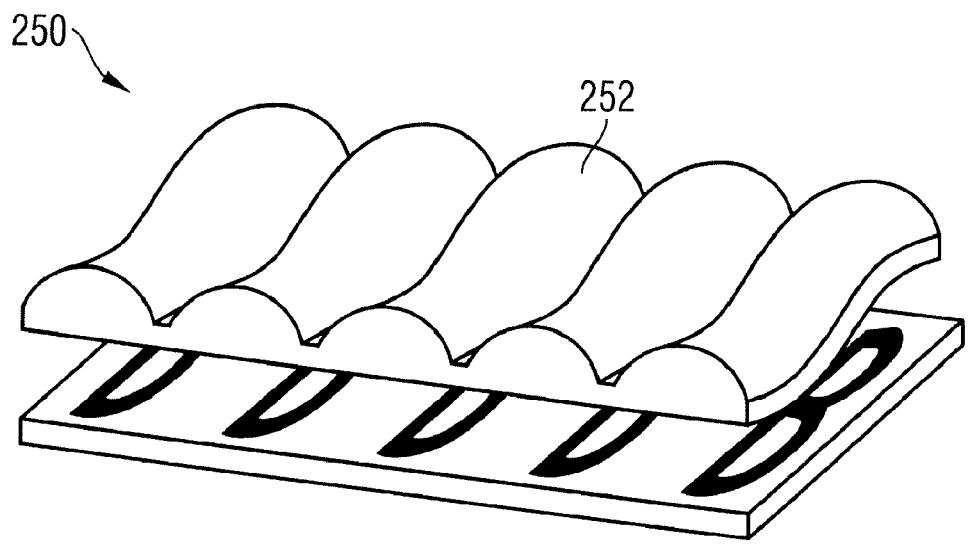
Figure 21:
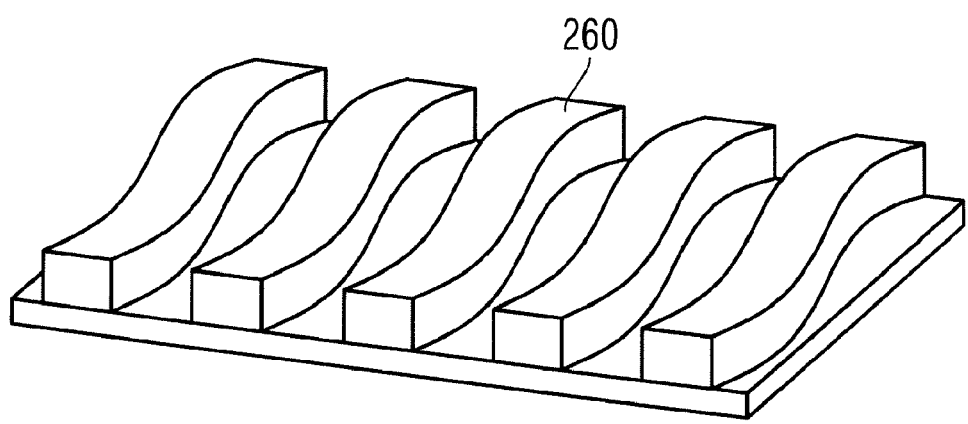
Figure 22:
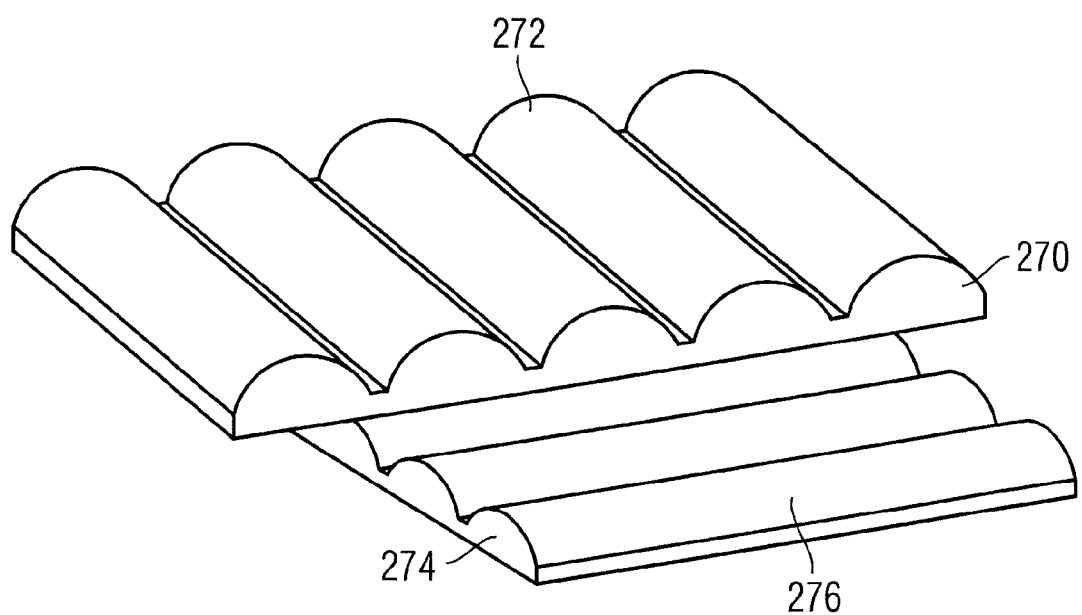

Shown are:

FIG. 1 a schematic diagram of a banknote having an embedded security thread and an affixed transfer element, FIG. 2 schematically, the layer structure of a security element according to the present invention, in cross section, FIG. 3 in (a), a top view of a window region of a security thread according to the present invention, and in (b) and (c), views of the window region of (a) when the security thread is tilted in one of the two arrow directions, FIG. 4 in (a) to (e), the five possible two-dimensional Bravais lattices, FIG. 5 schematically, the relationships when viewing a moiré magnification arrangement, to define the occurring variables, FIG. 6 in (a), a motif image whose micromotif elements are formed by distorted letter "F"s lying on the lattice sites of a low-symmetry Bravais lattice, and in (b), the magnified moiré image that results when a moiré magnification arrangement according to the present invention having the motif image in (a) is viewed, FIG. 7 a diagram as in FIG. 6 for a further exemplary embodiment of the present invention, FIG. 8 in (a), a motif image whose micromotif elements are formed by distorted letter "F"s or "P"s lying on the lattice sites of low-symmetry Bravais lattices, and in (b), the magnified moiré image that results when a moiré magnification arrangement according to the present invention having the motif image of (a) is viewed; the movement directions of the two letter arrays when tilted forward-back (vertical arrows in (a)) are indicated by the slanted arrows in (b), FIG. 9 in (a), the contour lines of a lens grid, in (b), the lens grid of (a) having fitted micromotif elements, and in (c), the magnified image appearing as a moiré, FIG. 10 a preferred embodiment according to the present invention in an illustration as in FIG. 9, in which the individual lenses for avoiding empty space in the magnified image were adapted in their shape to the shape of the micromotif elements, FIG. 11 in (a) to (c), in the left half of each image, an illustration as in FIG. 9(b), and in the right half of the image, an illustration as in FIG. 9 (c) wherein, in the shown embodiments, the motifs were distorted appropriately for the lens grid to avoid empty space in the magnified image, and an undistorted-appearing image was ensured through a suitable choice of image matrix, FIG. 12 a moiré magnifier whose appearance changes when curved or bent, with (a) showing the appearance in the planar state, without a motif being perceptible, (b) showing the appearance in the convexly bent state with motif, and (c) showing the appearance in the concavely bent state with a mirror-reversed motif, FIG. 13 a moiré magnifier in which a planar motif component shown in (a) is supplemented by a motif portion that becomes visible only upon the bending of the moiré magnifier shown in (b), FIG. 14 a moiré magnifier in which a first motif that is visible in the planar state (a) is replaced by a second motif upon bending (b) of the moiré magnifier, FIG. 15 in (a), schematically, a moiré magnifier having spherical lenses in a two-dimensional grid arrangement, and in (b), a moiré magnifier having cylindrical lenses in a line grating arrangement, FIG. 16 in (a), (c) and (e), differently oriented long motif elements, and in each of (b), (d) and (f), the moiré-magnified image composed of a plurality of such long motif elements, FIG. 17 an illustration as in FIG. 16 for long motif elements arranged along a curved line as they are to appear in moiré, FIG. 18 in (a), a micromotif element calculated to produce the image element in FIG. 17($a$), and in ($b$), the periodic micromotif grid, FIG. 19 in (a) to (c), a comparison of the distortion conditions in a cylindrical lens moiré magnifier and a moiré magnifier having normal lenses, and in (d) and (e), advantageous line grid or dot grid embodiments of the micromotif elements, FIG. 20 a moiré magnifier having a locally varying cylindrical lens grid, FIG. 21 a mesa structure in an intermediate step in the manufacture of a locally varying cylindrical lens grid, FIG. 22 an anamorphic lens grating composed of two intersecting, stacked cylindrical lens gratings, and FIG. 23 in (a), schematically, a top view of a further moiré magnifier arrangement according to an exemplary embodiment of the present invention, having spherical lenses and expansive, elongated micromotif elements, and in (b), the appearance when the motif grid and lens grid are stacked.

The invention will now be explained using a banknote as an example. For this, FIG. 1 shows a schematic diagram of a banknote 10 that is provided with two security elements 12 and 16 according to exemplary embodiments of the present invention. Here, the first security element constitutes a security thread 12 that emerges at certain window regions 14 on the surface of the banknote 10, while it is embedded in the interior of the banknote 10 in the regions lying therebetween. The second security element is formed by an affixed transfer element 16 of any shape.

The two security elements 12, 16 realize a particularly counterfeit-proof variant of a moiré magnification arrangement whose functional principle is initially explained with reference to FIGS. 2 and 3.

FIG. 2 shows schematically the layer structure of a security element 20 according to the present invention, in cross section, only the portions of the layer structure that are required to explain the functional principle being depicted. The security element 20 can constitute, for example, a security thread 12 or a transfer element 16, as shown in FIG. 1.

The security element 20 includes an optical spacing layer 22 whose top is provided with a regular arrangement of microlenses 24. As explained in detail below, the arrangement of the microlenses 24 forms a two-dimensional Bravais lattice having a prechosen symmetry. For the following explanation, a nearly hexagonal symmetry is assumed, even if the Bravais lattice according to the present invention can exhibit a lower symmetry and thus a more general shape. The microlenses 24 themselves exhibit a diameter and spacing of less than 50 µm, typically of about 10 µm to about 20 µm, and thus lie considerably below the resolution limit of the naked eye.

On the bottom of the spacing layer 22, the security element 20 further exhibits a motif layer 26 that includes a likewise regular arrangement of identical micromotif elements 28. Also the arrangement of the micromotif elements 28 forms a two-dimensional Bravais lattice having a prechosen symmetry. As indicated in FIG. 2, the Bravais lattice of the micromotif elements 28 differs slightly in its symmetry and/or in the size of the lattice parameters from the Bravais lattice of the microlenses 24 to produce the desired moiré magnification effect. In any case, the grating period of the arrangement of the micromotif elements 28 is on the same order of magnitude as that of the microlenses 24 such that the micromotif elements 28 are likewise not perceptible even with the naked eye.

The optical thickness of the spacing layer 22 and the focal length of the microlenses 24 are so coordinated with each other that the micromotif elements 28 are spaced approximately the lens focal length apart. Due to the slightly differing lattice parameters, the viewer sees, when viewing the security element 20 from above, a somewhat different sub-region of the micromotif element 28 each time such that the plurality of microlenses produces, overall, a magnified image of the micromotif elements 28.

Here, the moiré magnification depends on the relative difference between the lattice parameters of the Bravais lattice used. If, for example, the grating periods of two hexagonal lattices differ by 1%, then the moiré magnification is 100×. With decreasing relative difference, the moiré magnification tends toward infinity. As explained in greater detail below, for more general lattice symmetries, the moiré magnification is no longer a scalar, but rather is described by a 2×2 magnification matrix. This accommodates the fact that the magnification factor in the general case is differently sized in different directions of the plane, such that rotations and distortions must also be accounted for.

The focal length of the microlenses 24 has no influence on the moiré magnification. It does, however, influence, together with the difference in the lattice parameters, the apparent floating height or floating depth at which the magnified motif image appears for the viewer to float in front of or behind the image plane.

The lattice parameters of the Bravais lattice of the micromotif elements 28 and of the microlenses 24 can, for example, be coordinated with each other in such a way that, when the security element 20 is tilted, motion effects result that run counter to intuition and that are explained with reference to FIG. 3. FIG. 3 shows, in (a), a top view of a window region 14 of a security thread 12 according to the present invention. When viewed vertically, the window region shows two stacked letters "F" in the center of the security thread 12. Here, as explained above, the one or more millimeter large image 36 of the letter "F"s that is visible for the viewer constitutes a moiré-magnified imaging of sub-regions of a plurality of microletter "F"s. At a moiré magnification factor of 100, for example, microletters having a size of just 10 μm result in image letters 36 of a size of 1 mm.

Figures 3A, 3B, 3C:
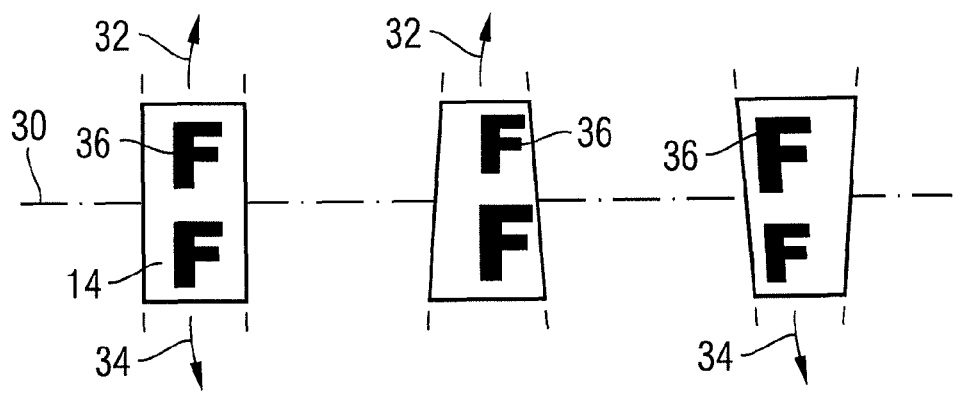

If the window region 14 is tilted about an axis 30 in direction 32 or 34, then, in the exemplary embodiment, the image 36 of the letter "F" moves, counter to intuition, not parallel, but rather perpendicular to direction 32, 34, as depicted in FIGS. 3(b) and (c). Because of the memorable optical effect that can be realized in the moiré magnifier, the viewer's attention is strongly drawn to the security element.

According to the present invention, the Bravais lattices of the arrangement of the micromotif elements 28 and of the arrangement of the microlenses 24 are now chosen such that at least one of the two Bravais lattices exhibits no symmetry axis in the plane of the arrangement. In the more general case described below, in which the lattice parameters of the Bravais lattices can change slowly across the dimension of the security element, this condition means that at least one of the constant Bravais lattices that are present locally in each case exhibits no symmetry axis in the plane of the arrangement.

To explain this in greater detail, FIG. 4 shows, in (a) to (e), the five possible two-dimensional Bravais lattices. All periodic planar arrangements can be allocated to one of these Bravais lattices, the Bravais lattice having the highest symmetry being chosen for unambiguous allocation. These five Bravais lattices are the square lattice having a lattice cell having identically long sides s and an angle σ of 90° in between (FIG. 4(a)), the rectangular lattice having a lattice cell having sides $s_1$ and $s_2$ of unequal length and an angle σ of 90° in between (FIG. 4(b)), the rhombic lattice having a lattice cell having sides of equal length and any angle σ in between (FIG. 4(c), sometimes also referred to as a face-centered rectangular lattice), the hexagonal lattice having a lattice cell having sides of equal length and an angle σ of 60° in between (FIG. 4(d)), and the parallelogram lattice having an oblique lattice cell having sides $s_1$ and $s_2$ of unequal length and any angle σ in between (FIG. 4(e)).

The Bravais lattices in FIG. 4(a) to (d) each exhibit at least one symmetry axis in the plane of the arrangement. Such a symmetry axis is drawn in each of the figures. In contrast to this, the parallelogram lattice in FIG. 4(e) exhibits no symmetry axis in the plane of the arrangement. Its only symmetry is a two-fold axis of symmetry perpendicular to the arrangement plane.

Thus, for example, if a micromotif element 28 is placed on each lattice point 40 of a parallelogram lattice according to FIG. 4(e), then the arrangement of the micromotif elements 28 exhibits no symmetry axis in the plane of the arrangement. The same applies in the event that a microlens 24 is placed on each lattice point 40 of a parallelogram lattice according to FIG. 4(e), or that parallelogram lattices according to FIG. 4(e) are used for both arrangements.

The use of Bravais lattices having low symmetry for at least one of the arrangements of micromotif elements or of microlenses offers the following advantages compared with the use of the higher-symmetry Bravais lattices:

A moiré magnification arrangement having a low-symmetry lattice arrangement is very difficult to imitate since, in doing so, a certain angle in the lattice cell must be reproduced exactly, otherwise the correct image will not be created upon viewing. Here, precisely defined angles in the lattice cells can be applied for hidden identification of protected products according to the present invention. For example, different products can receive different angles that can be defined in such a way that, in the magnified image, hardly any difference is detectable for the viewer. Furthermore, it must be emphasized that all attractive effects that are typically realizable with higher-symmetry moiré magnification arrangements can also be realized with the low-symmetry moiré magnification arrangements according to the present invention.

However, the connection between the motif image, the arrangement of the microlenses and the magnified image is more complex in the low-symmetry moiré magnification arrangements than in the known high-symmetry arrangements. One possibility for calculating a suitable motif image from a predefined desired magnified image is thus explained in detail below:

To define the occurring variables, FIG. 5 shows first, schematically, the relationships when viewing a moiré magnification arrangement 50. The moiré magnification arrangement 50, which is not depicted to scale, includes a motif plane 52 in which the motif image is arranged, a lens plane 54 in which the microlens arrangement is located, and produces a moiré image plane 56 in which the magnified image perceived by the viewer 58 is described.

The arrangement of micromotif elements in the motif plane 52 is described by a two-dimensional Bravais lattice whose lattice cell is specified by the vectors $\vec{u}_1$ and $\vec{u}_2$ (having the components $u_{11}$, $u_{21}$ and $u_{12}$, $u_{22}$). Similarly, the arrangement of microlenses in the lens plane 54 is described by a two-dimensional Bravais lattice whose lattice cell is specified by the vectors $w_1$ and $w_2$ (having the components $w_{11}$, $w_{21}$ and $w_{12}$, $w_{22}$). The lattice cell in the moiré image plane 56 is described with the vectors $\vec{t}_1$ and $\vec{t}_2$ (having the components $t_{11}$, $t_{21}$ and $t_{12}$, $t_{22}$).

The coordinates of the points of the motif plane 52 are named with small letters, those of the points of the moiré image plane 56 with capital letters, such that $$\vec{r} = \begin{pmatrix} x \\ y \end{pmatrix}$$

specifies a general point of the motif plane 52, $$\vec{R} = \begin{pmatrix} X \\ Y \end{pmatrix}$$

a general point of the moiré image plane 56. These variables are already sufficient to describe a vertical viewing (viewing direction 60) of the moiré magnification arrangement. To be able to take also non-vertical viewing directions into account, for instance the direction 62, a displacement is additionally permitted between the lens plane 54 and the motif plane 52 that is specified by a displacement vector $$\vec{r}_0 = \begin{pmatrix} x_0 \\ y_0 \end{pmatrix}$$

in the motif plane 52.

If, for the sake of simpler illustration, the matrices $$\vec{\vec{U}} = \begin{pmatrix} u_{11} & u_{12} \\ u_{21} & u_{22} \end{pmatrix}, \vec{\vec{W}} = \begin{pmatrix} w_{11} & w_{12} \\ w_{21} & w_{22} \end{pmatrix} \text{ and } \vec{\vec{T}} = \begin{pmatrix} t_{11} & t_{12} \\ t_{21} & t_{22} \end{pmatrix},$$

are used, then the moiré image lattice composed of the lattice vectors of the micromotif element arrangement and of the microlens arrangement results as $$\vec{\vec{T}} = \vec{\vec{W}} \cdot (\vec{\vec{W}} - \vec{\vec{U}})^{-1} \cdot \vec{\vec{U}}. \tag{1}$$

The image points of the moiré image plane 56 can be determined from the image points of the motif plane 52 with the aid of the relationship $$\vec{R} = \vec{\vec{W}} \cdot (\vec{\vec{W}} - \vec{\vec{U}})^{-1} \cdot (\vec{r} - \vec{r}_0). \tag{2}$$

In manufacturing moiré magnification arrangements, normally the reverse path is taken. The magnified moiré image and the lens arrangement are specified and, from that, a—normally distorted—motif image calculated. Instead of explicitly specifying the lens arrangement, also only certain limitations or conditions can be placed on the lens arrangement, and the motif image calculated together with the required lens arrangement. Here, the lattice vectors of the micromotif element arrangement result through suitable conversion of the relationship (1) into $$\vec{\vec{U}} = \vec{\vec{W}} \cdot (\vec{\vec{T}} + \vec{\vec{W}})^{-1} \cdot \vec{\vec{T}}. \tag{3}$$

The image points of the motif plane can be determined with the aid of the relationship $$\vec{r} = \vec{\vec{W}} \cdot (\vec{\vec{T}} + \vec{\vec{W}})^{-1} \cdot \vec{R} + \vec{r}_0. \tag{4}$$

To reach a general description, the transformation matrix $$\vec{\vec{A}} = \vec{\vec{W}} \cdot (\vec{\vec{W}} - \vec{\vec{U}})^{-1}$$

that transitions the coordinates of the points of the motif plane 52 and the points of the moiré image plane 56 into one another is defined, $$\vec{R} = \vec{\vec{A}} \cdot (\vec{r} - \vec{r}_0) \tag{5a}$$

$$\vec{r} = \vec{\vec{A}}^{-1} \cdot \vec{R} + \vec{r}_0. \tag{5b}$$

From two of the four matrices $\vec{\vec{U}}, \vec{\vec{W}}, \vec{\vec{T}}, \vec{\vec{A}}$ in each case, the other two can be calculated. In particular, the following relationships apply:

$$\vec{\vec{T}} = \vec{\vec{A}} \cdot \vec{\vec{U}} = \vec{\vec{W}} \cdot (\vec{\vec{W}} - \vec{\vec{U}})^{-1} \cdot \vec{\vec{U}} = (\vec{\vec{A}} - \vec{\vec{I}}) \cdot \vec{\vec{W}} \tag{6a}$$

$$\vec{\vec{U}} = \vec{\vec{W}} \cdot (\vec{\vec{T}} + \vec{\vec{W}})^{-1} \cdot \vec{\vec{T}} = \vec{\vec{A}}^{-1} \cdot \vec{\vec{T}} = (\vec{\vec{I}} - \vec{\vec{A}}^{-1}) \cdot \vec{\vec{W}} \tag{6b}$$

$$\vec{\vec{W}} = \vec{\vec{U}} \cdot (\vec{\vec{T}} - \vec{\vec{U}})^{-1} \cdot \vec{\vec{T}} = (\vec{\vec{A}} - \vec{\vec{I}})^{-1} \cdot \vec{\vec{T}} = (\vec{\vec{A}} - \vec{\vec{I}})^{-1} \cdot \vec{\vec{A}} \cdot \vec{\vec{U}} \tag{6c}$$

$$\vec{\vec{A}} = \vec{\vec{W}} \cdot (\vec{\vec{W}} - \vec{\vec{U}})^{-1} = (\vec{\vec{T}} + \vec{\vec{W}}) \cdot \vec{\vec{W}}^{-1} = \vec{\vec{T}} \cdot \vec{\vec{U}} \tag{6d}$$

As can immediately be seen, the relationships (5a,b) and (6a-d) include the relationships (1) to (4) given above as a special case. Upon specification of two of the three matrices $\vec{\vec{U}}, \vec{\vec{W}}, \vec{\vec{T}}$, with the aid of the relationships (6a-d), the third matrix and the transformation matrix $\vec{\vec{A}}$ can be calculated, and from that, with the aid of the relationships (5a) and (5b), the desired point coordinates.

It is understood that the transformation matrix $\vec{\vec{A}}$ and one of the three matrices $\vec{\vec{U}}, \vec{\vec{W}}, \vec{\vec{T}}$, for example the matrix of the microlenses $\vec{\vec{W}}$, can also be specified directly and the other two matrices can be determined using the relationships (6a-d).

The described approach will now be explained in greater detail based on some specific examples with reference to FIGS. 6 to 8.

Figure 6A:
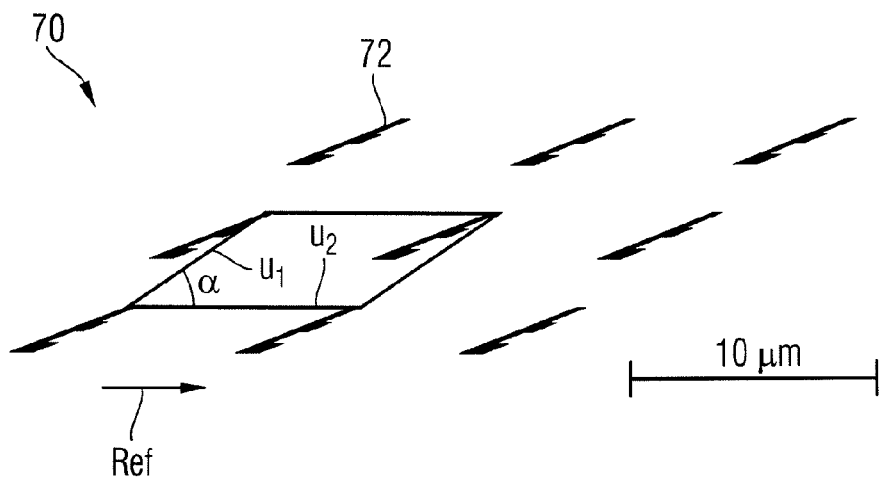

First, FIG. 6 shows, in (a), a motif image 70 whose micromotif elements 72 are formed, by way of example, by suitable distorted letter "F"s lying on the lattice sites of a low-symmetry Bravais lattice. Specifically, the unit cell of the parallelogram lattice in FIG. 6(a) is given by vectors $\vec{u}_1$ and $\vec{u}_2$ with $u_1=|\vec{u}_1|=9.1$ μm, $u_2=|\vec{u}_2|=6.6$ μm and $\alpha=\angle(\vec{u}_1,\vec{u}_2)=32°$. The lattice cells themselves exhibit an angle of $\delta_1=0°$ to a reference direction Ref.

Taken together with this is an arrangement of microlenses, itself not shown, that lie on the lattice sites of a second Bravais lattice. In the exemplary embodiment, the second Bravais lattice is likewise a low-symmetry parallelogram lattice having a unit cell that is given by the vectors $\vec{w}_1$ and $\vec{w}_2$ with $w_1=|\vec{w}_1|=9.2$ μm, $w_2=|\vec{w}_2|=6.5$ μm and $\beta=\angle(\vec{w}_1,\vec{w}_2)=32°$. The lattice cells of the second Bravais lattice themselves exhibit an angle of $\delta_2=0°$ to the reference direction Ref.

Figure 6B:
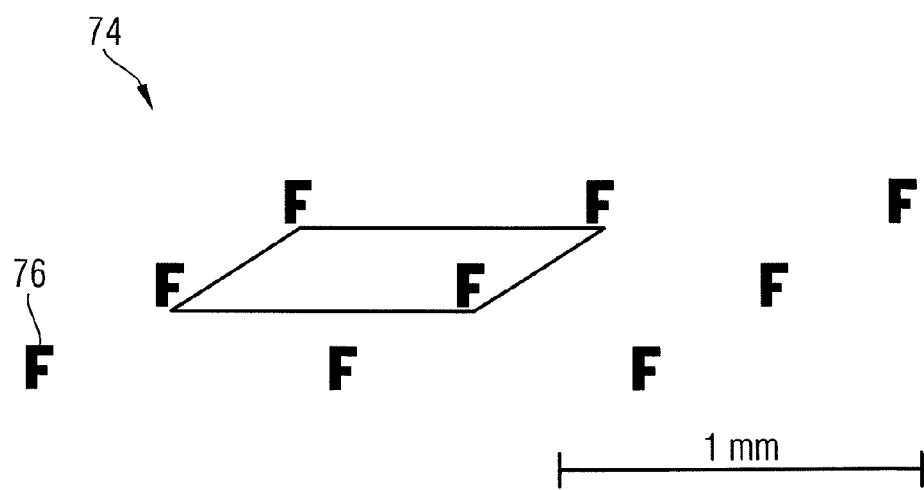

If the displacement vector is set to zero (so $x_0=y_0=0$), the magnified moiré image 74 depicted in FIG. 6(b) results for a viewer who looks at the moiré magnification arrangement from a normal viewing distance (which, in any case, is large compared with the lens focal length of ≈10 μm). As can be clearly seen, the distortion of the letter "F"s in the motif image 72 is chosen just so that it is compensated for by the likewise distorting moiré effect and the viewer sees undistorted and magnified letter "F"s 76. Note that the scale in FIG. 6(b) is about 100 times greater than in FIG. 6(a).

The mapping from FIG. 6(a) to FIG. 6(b) can be calculated with the aid of the above-indicated relationships (1) and (2). Conversely, using the relationships (3) and (4), the desired moiré image 74 in FIG. 6(b) can also be the starting point, and the motif image 72 be calculated having the required bending.

A further example of a motif image 80 and a moiré image 84 produced therefrom is shown in FIG. 7. In the exemplary embodiment in FIG. 7, again, micromotif elements 82 represented by suitably distorted letter "F"s lie on the lattice sites of a low-symmetry Bravais lattice. Specifically, the unit cell of the parallelogram lattice in FIG. 7(a) is given by vectors $\vec{u}_1$ and $\vec{u}_2$ with $u_1=|\vec{u}_1|=7.3$ μm, $|\vec{u}_2|=9.3$ μm and $\alpha=\angle(\vec{u}_1,\vec{u}_2)=45°$. The lattice cells exhibit an angle of $\delta_1=-20.3°$ to a reference direction Ref.

Taken together with this is an arrangement of microlenses that lie on the lattice sites of a second low-symmetry Bravais lattice. In the exemplary embodiment, the second Bravais lattice is likewise a low-symmetry parallelogram lattice having a unit cell that is given by the vectors $\vec{w}_1$ and $\vec{w}_2$ with $w_1=|\vec{w}_1|=7.4$ μm, $w_2=|\vec{w}_2|=9.2$ μm and $\delta_2=\angle(\vec{w}_1,\vec{w}_2)=45°$. The lattice cells of the second Bravais lattice exhibit an angle of $\delta=-20.3°$ to the reference direction Ref.

If the displacement vector is set to zero (so $x_0=y_0=0$), the magnified moiré image 84 depicted in FIG. 7(b) results for a viewer who looks at the moiré magnification arrangement from a normal viewing distance. Here, too, the distortion of the letter "F"s 82 in the motif image 80 is chosen just so that it is compensated for by the likewise distorting moiré-effect and the viewer sees undistorted and magnified letter "F"s 86.

In addition, due to the lattice parameters chosen for FIG. 7, an orthoparallactic motion effect occurs that was already described in connection with FIG. 3. If, namely, the motif image 80 in FIG. 7(a) is tilted laterally, then the magnified letters 86 move perpendicular to the tilt direction and not parallel thereto, as one would intuitively expect. This orthoparallactic motion effect results directly from relationships (2) and (4), but it can also be easily understood graphically if it is realized that a lateral tilting of the motif image 80 moves the motif letters 82 parallel to the long back of the letter "F"s, and that, due to the rotated position of the image letters 86, this movement parallel to the long back corresponds to an up and down movement in the moiré-magnified image 84.

The transformation matrix $\vec{A}$ describes, in general, a distortion of the motif at moiré formation. In a prominent special case in which the motif is not distorted at moiré formation, the matrices $\vec{U}$, $\vec{W}$ are chosen such that they have the same shape, that is, that the side lengths $s_1$ and $s_2$ and the angle $\sigma$ in between the lattices of the motif plane and the microlens arrangement are identical, but the lattices are rotated toward each other by a certain angle $\phi \neq 0$.

In this case, the transformation matrix $\vec{A}$ describes a magnification factor and a rotation, but no distortion, such that the shape of the motif when viewed is retained except for magnification and rotation. This is true independently of the type of Bravais lattice chosen, especially also for the parallelogram lattices preferred according to the present invention. For this special case, the magnification factor and rotation angle between the image and motif plane are given by $$V = 1/(2 \sin(\phi/2)), \text{ and}$$

$$\Delta = 90° - \phi/2$$

as can easily be seen from an explicit representation of the transformation matrix $\vec{A}$.

Since a moiré magnifier is typically designed having high magnification, so having a small angle $\phi$, the rotation angle $\Delta$ between the image and motif plane is approximately 90° such that the above-described orthoparallactic motion effect results.

However, an orthoparallactic movement is obtained not only with this method, in which otherwise similar motif grids and lens grids are rotated toward each other. As already explained in the description of FIG. 7, orthoparallactic movement also results upon certain distortions of the lattices. In particularly simple variants for producing exact orthoparallactic movements, the movement and magnification matrix $\vec{A}$ has the form $$\vec{A} = v \cdot \begin{pmatrix} 0 & 1 \\ 1 & 0 \end{pmatrix} \text{ or}$$

$$\vec{A} = v \cdot \begin{pmatrix} 0 & -1 \\ 1 & 0 \end{pmatrix} \text{ or}$$

$$\vec{A} = v \cdot \begin{pmatrix} 0 & 1 \\ -1 & 0 \end{pmatrix} \text{ or}$$

$$\vec{A} = v \cdot \begin{pmatrix} 0 & -1 \\ -1 & 0 \end{pmatrix},$$

the factor v being the desired magnification factor between the motif and the moiré.

In the event that the orthoparallactic movement speeds are intended to be different vertically and horizontally, the matrix $\vec{A}$ takes on the following shape having different magnification factors in the vertical and horizontal direction:

$$\vec{A} = \begin{pmatrix} 0 & b \\ a & 0 \end{pmatrix} \text{ or } \vec{A} = \begin{pmatrix} 0 & -b \\ a & 0 \end{pmatrix} \text{ or } \vec{A} = \begin{pmatrix} 0 & b \\ -a & 0 \end{pmatrix} \text{ or } \vec{A} = \begin{pmatrix} 0 & -b \\ -a & 0 \end{pmatrix}.$$

As shown below, also any movement directions γ not equal to 0° and 90° can be realized through appropriate choice of the components of the movement matrix $\vec{A}$.

The transformation matrix $\vec{A}$ also describes the movement of a moiré image upon the movement of the moiré-forming arrangement, which derives from the displacement of the motif plane 52 against the lens plane 54:

If a lens grating or a hole lattice at a distance from the motif grid is used in the moiré magnifier, then a tilting of the arrangement means a displacement of the motif, since the viewer then looks obliquely through the lenses or holes and another site of the motif is thus brought out by the respective lens (or the respective hole) than without tilting.

If, in the moiré magnifier, a lateral tilting leads to a lateral displacement, then the moiré image appears, when viewed with both eyes, having depth effect: Due to the lateral "tilt angle" of about 15° (between the eyes at a normal viewing distance of approximately 25 centimeters), the laterally displaced moiré images seen are interpreted by the human brain as if the motif laid, depending on the direction of the lateral displacement, in front of or behind the actual substrate plane. Here, the depth effect is based on the magnitude of the displacement.

Thus, if it is desired to produce a three-dimensional image effect with a moiré magnifier, the movement behavior when tilted laterally is decisive. While a lateral tilt can be exploited preferably for 3D effect, it is appropriate to use a forward-back tilt for attractive movement of the motif in the image context. Thus, for the design of a moiré magnifier, it is important to know and to systematically control its behavior when tilted (laterally and forward-backward). According to the present invention, this can happen, for example, due to the following considerations:

The columns of the transformation matrix $\vec{A}$ can be interpreted as vectors, $$\vec{A} = \begin{pmatrix} a_{11} & a_{12} \\ a_{21} & a_{22} \end{pmatrix}, \vec{a}_1 = \begin{pmatrix} a_{11} \\ a_{21} \end{pmatrix}, \vec{a}_2 = \begin{pmatrix} a_{12} \\ a_{22} \end{pmatrix}.$$

It is now seen that the vector $\vec{a}_1$ specifies in which direction the moiré image moves when the arrangement composed of the motif and lens grid is tilted laterally, and that the vector $\vec{a}_2$ specifies in which direction the moiré image moves when the arrangement composed of the motif and lens grid is tilted forward-backward.

For the specified $\vec{A}$, the movement direction results as follows: Upon tilting the motif plane laterally, the moiré moves at an angle $\gamma_1$ to the horizontal, given by $$\tan\gamma_1 = \frac{a_{21}}{a_{11}}.$$

Similarly, when tilted forward-backward, the moiré moves at an angle γ2 to the horizontal, given by $$\tan\gamma_2 = \frac{a_{22}}{a_{12}}.$$

In a specific exemplary embodiment that will now be described with reference to FIG. 8, the motif is to consist of two letter arrays having the letters "F" and "P", the two letters being arranged in different arrays. When the moiré magnifier arrangement is viewed with both eyes, one of the letter arrays F or P is to appear floating approximately 1 mm in front of the substrate plane, and the other letter array is to appear floating approx. 1 mm behind the substrate plane. When tilted forward-back, the one letter array F or P is to run from top left to the bottom right and back, and the other letter array is to simultaneously run from bottom left to top right and back, each at an exemplarily chosen angle of about 40°.

The moiré magnifier is to be assembled having lenses having a focal length of about 10 micrometers and lateral lens spacing on the same scale. The letters in the array image are to appear about 1 mm in size.

For the calculation, it is assumed that $w_1$, $w_2$ are the side lengths of the lens grid unit cell and cal is the angle in between the sides in the lower left corner of the unit cell, and that $u_1$, $u_2$ are the side lengths of the motif grid unit cell and $\alpha_2$ is the angle in between the sides in the lower left corner of the unit cell.

In the lens plane, lenses having a focal length of 10 μm are arranged in a grid having the data $$w_1 = w_2 = 10 \text{ μm}, \alpha_1 = 60°$$

In the motif plane, the letters F and P are created distorted, as shown in FIG. 8(*a*). Here, the letter F is arranged in a grid 90 having the data $$u_1 = 10.1 \text{ μm}, u_2 = 9.9 \text{ μm}, \alpha_2 = 60°,$$

and the letter P in a grid 92 having the data $$u_1 = 9.9 \text{ μm}, u_2 = 10.1 \text{ μm}, \alpha_2 = 120°.$$

With these details, and with the aid of the relationship (6d), the matrix $\vec{A}$ can be calculated, and with the relationship (5b), the distorted motifs "F" and "P", as depicted in FIG. 8(*a*). With these details, and with the aid of the relationship (6d), the matrix $\vec{A}$ can be calculated, and with the relationship (5b), the distorted motifs "F" and "p", as depicted in FIG. 8(*a*). This pattern having the distorted and displaced letters F and P is embossed in a lacquer layer on one side of a foil on whose other side the above-specified lens grid is attached. Here, the foil thickness is chosen such that the motifs lie in the focal plane of the lenses. Here, the foil thickness is chosen such that the motifs lie in the focal plane of the lenses.

If the moiré magnifier formed in this way is now viewed, then the viewer sees the undistorted, magnified letters F and P, as shown in FIG. 8(*b*). The mixed lattices composed of F's and P's do not interfere with each other since the lens grid brings out only the image points belonging to one viewing direction and the other sections remain covered. Here, it is key that the superimposed F- and P-arrays be designed for one and the same lens array.

After construction, the magnified letters "F" and "P" move when the arrangement is tilted in the desired directions, which are indicated in FIG. 8(*b*) by the arrows 94 for the letters F and the arrows 96 for the letters P.

Coming back to the procedure already mentioned above, in the manufacture of moiré magnification arrangements, in a particularly preferred variant, the following procedure can be used. For explanation, the relationship (6b) in the, for the following discussion, particularly suitable form $$\vec{U} = \vec{W} - \vec{A}^{-1} \cdot \vec{W} \qquad (7)$$

is used.

First, a desired motif, for instance a letter sequence, is chosen, and a 3D behavior and/or a movement behavior for lateral and forward-back tilting is designed. Then, as described above, the transformation matrix $\vec{A}$ is defined that produces the desired movements of the moiré image and the 3D impression. If necessary, the motif is reworked again to adjust it to the transformation.

The motif to be introduced is itself obtained from the desired motif in that the inverse matrix $\vec{A}^{-1}$ is applied to the desired motif. This transformation can occur in common drawing programs such as "Corel Draw" or "Illustrator" if the transformation $\vec{A}^{-1}$ is generated from scaling, reflecting, shearing and rotating, since these transformation possibilities are provided by such drawing programs. Both the matrix $\vec{A}$ and the inverse matrix $\vec{A}^{-1}$ represent linear transformations that can be represented as a product of a scaling, a shearing and a rotation. Here, scaling with a leading sign also comprises enlarging, shrinking, stretching, compressing and reflecting.

Instead of working with a drawing program, any transformation matrix or matrix combination can also be applied with mathematical computer programs, for instance "Mathematica", to a desired motif given as an image point or vector graphic to produce the motif to be introduced.

A lens grid $\vec{W}$ can now be chosen as the Bravais lattice having any symmetry, without this having a content-related influence on the moiré image and on its movement. In this design, the lens grid merely defines the spacing at which and the directions in which the moiré image repeats.

With the inverse matrix $\vec{A}^{-1}$, $\vec{A}^{-1}$, $\vec{W}$ is now formed such that, if $\vec{A}$ represents, for example, a 100× magnification and a rotation by the angle φ, the transformation $\vec{A}^{-1} \cdot \vec{W}$ means that the lattice $\vec{W}$ is rotated by the angle −φ and shrunk down to a 100th.

In the next step, the motif grid $\vec{U}$ is obtained as the difference matrix $\vec{W} - \vec{A}^{-1} \cdot \vec{W}$. The motif grid $\vec{U}$ thus obtained now has the property of producing, together with the previously freely chosen lens grid $\vec{W}$, the desired motif movements $\vec{A}$.

The freely chosen lens-grid Bravais lattice $\vec{W}$ can have high or low symmetry, and a Bravais lattice having low parallelogram symmetry generally results for the motif grid $\vec{U}$ by appending $-\vec{A}^{-1} \cdot \vec{W}$. In the last step, the motif to be introduced, transformed with $\vec{A}^{-1}$, is now arranged as an array having the array grid data $\vec{U}$.

The described procedure can also be applied when the matrices vary location-dependently:

If the matrix $\vec{A}$ is varied location-dependently, the lens grid $\vec{W}$ held constant and the motif grid determined according to the relationship $$\vec{U} = \vec{W} - \vec{A}^{-1} \cdot \vec{W},$$

then a location dependently varying distortion and/or movement and/or 3D depth is obtained.

Similarly, it is true that: If the matrix $\vec{A}$ is varied location-dependently, the motif grid $\vec{U}$ held constant and the lens grid determined according to the relationship $$\vec{W} = (\vec{A} - \vec{I})^{-1} \cdot \vec{A} \cdot \vec{U},$$

then a location-dependently varying distortion and/or movement and/or 3D depth is obtained.

Conversely, it is true that: If the matrix $\vec{A}$ is held constant and the grids $\vec{W}$ and $\vec{U}$ varied in a way that satisfies the relationship $$\vec{U} = \vec{W} - \vec{A}^{-1} \cdot \vec{W},$$

then the appearance and the movement and 3D properties of the motifs in the moiré image remain location independent, but the spacing of the moiré images in the lattice varies location-dependently.

Of course all variables $\vec{A}$, $\vec{W}$, $\vec{U}$ can also be varied location-dependently taking the relationship (7) into account, which results in both motif appearance and motif spacing varying location-dependently in the moiré grating.

The question of how the motif elements and lens elements arranged in grids can be optimized appropriately for the grid properties poses a further problem.

For illustration, FIG. 9 shows, as the motif element, the letter sequence "ABCD" that is arranged periodically repeatingly under lenses having a circular contour arranged in the shape of a grid. In FIG. 9(a), in the contour lines of the lens array 100, concentric circles 102 are drawn in that, for conventional lenses, are to indicate the contour lines on the lens surfaces. For special lenses, the concentric circles can also have another meaning, e.g. level boundaries in Fresnel lenses, optical grating lines in holographic lenses, lines having the same refractive index gradient in gradient lenses, etc. In FIG. 9(b), the letter sequence 104 "ABCD" is fit in the lens grid 100, and FIG. 9(c) shows the text 106 appearing as a moiré, wherein it is clear that the simple adjustment in FIG. 9(b) results in much unused empty space 108. Also, the font size cannot be chosen optimally in relation to the available surface.

Figure 10A:
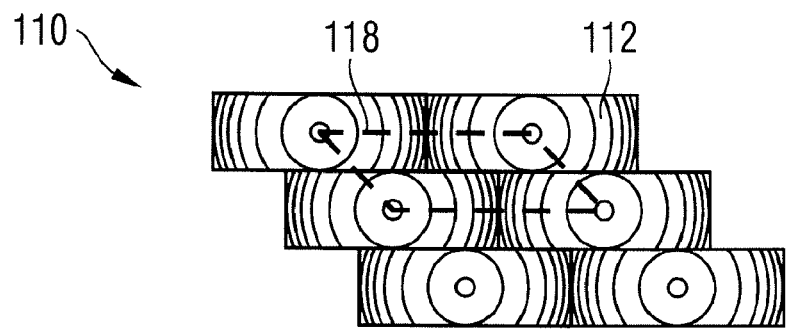
Figure 10B:
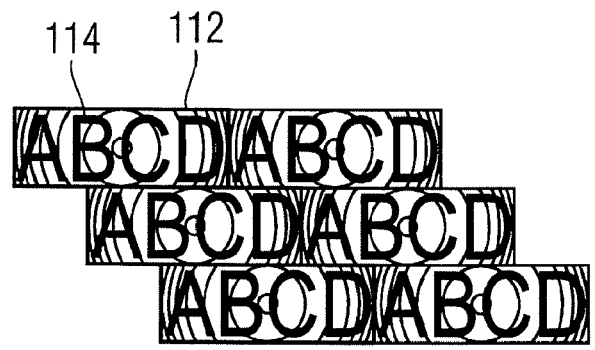
Figure 10C:
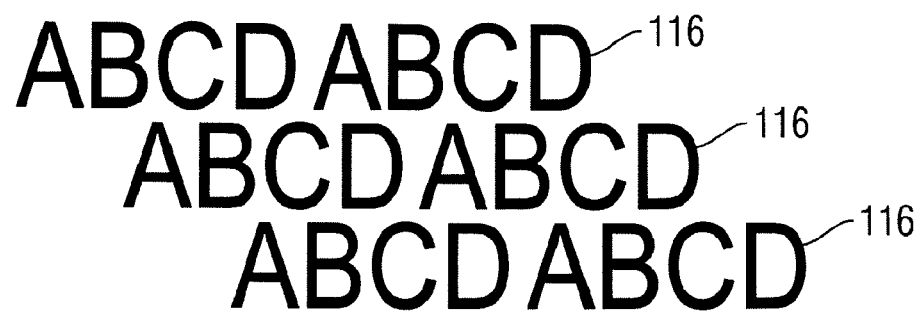

One possible approach to solving the problem is illustrated in FIG. 10. Here, FIG. 10(a) shows a lens array 110 in which the individual lenses 112 are cut to fit the shape of the motif elements 114, here again the letter sequence "ABCD". FIG. 10(b) shows the motifs 114 fit in the lenses 112, and FIG. 10(c), the motif 116 appearing as a moiré without unused spaces. In this example, both the lens array and the motif array have parallelogram symmetry, a parallelogram unit cell 118 being drawn in in FIG. 10(a). The contours of the lenses 112 and motifs 114 need not be parallelograms, they can, in principle, have any design, and for instance as in the exemplary embodiment, be joined together as rectangles or having any edges.

FIG. 11 shows further possibilities to avoid unused spaces in the context of the present invention. In this variant of the present invention, the motif elements are designed to be distorted appropriately for the lens grid, and it is ensured through suitable choice of the image matrix $\vec{A}$ that the motif that appears undistorted in the moiré arrangement appears magnified.

FIG. 11(a) shows, in the left half of the image, an appropriately horizontally compressed motif 124 under a lens grid 120, and in the right half of the image, the moiré motif 126 without unused spaces that appears magnified when viewed. Similarly, FIG. 11(b) shows the procedure for a vertically compressed motif 134 and FIG. 11(c) for an obliquely arranged motif 144, each of which is arranged under a lens grid 130 or 140. When viewed, the moiré images 136 and 146 result, which exhibit no superfluous spaces.

Further possibilities for avoiding unused spaces result according to the present invention through the use of special lens systems in the lens grid.

Instead of conventional lenses, especially for lattices having strongly different side lengths, an anamorphic lens grating can be used. Such an anamorphic lens grating consists, in the simplest case, of intersecting stacked cylindrical lens gratings 270 and 274, as shown in FIG. 22. The cylindrical lenses 272 and 276 in the two lattices have a different curvature such that, in the image plane, imaging is sharp but distorted (in contrast to astigmatic ellipse-shaped lenses, which have no uniform image plane and imaging is thus blurred). In non-orthogonal lattices, more than two superimposed cylindrical lens gratings are needed for an anamorphic image.

According to the present invention, the cylindrical lenses in the linear cylindrical lens gratings are arranged such that the desired two-dimensional Bravais lattice $$W = \begin{pmatrix} w_{11} & w_{12} \\ w_{21} & w_{22} \end{pmatrix}$$

is created.

Gratings with anamorphic effect to be used according to the present invention can also be realized by stacked, spaced-apart arrays composed of gaps instead of stacked arrays composed of cylindrical lenses. Anamorphic systems to be used according to the present invention can also be assembled from combinations of normal lenses and cylindrical lenses or combinations of lenses and prisms, etc.

Exemplary Embodiments with Moiré Magnifier Arrangements Having Cylindrical Lenses:

An advantageous special case is the moiré magnifier having cylindrical lenses. In addition to spherical, aspherical, astigmatic and anamorphic lenses or lens systems, imaging systems in moiré magnifiers can also be cylindrical.

Moiré magnifiers having cylindrical lenses differ substantially from the cylindrical lens alternating image method described in many variants in the background art in the following features:

Conventional alternating images having cylindrical lenses include, under the cylindrical lens array, images broken down into strips and so nested in one another that, depending on the viewing direction, different images can be seen. Here, the following variants are of particular interest:

Variant 1: Images are obtained that, when the viewing direction is changed, move when images of the same motif having different movement states are nested.

Variant 2: Three-dimensional diorama-like images are obtained when images that include views of the same motif from different directions are nested.

Variant 3: Flip-flop images are obtained when different images are nested such that different images can be seen from each different direction.

In contrast, the inventive moiré magnifiers having cylindrical lenses include under each lens in the cylindrical lens array a complete image of the shrunk and distorted motif. Here, the array arrangements differ from the motif array and the lens array such that, when the motif array is viewed through the lens array, the motif array appears magnified and rectified as a result of the moiré effect.

Cylindrical lens moiré magnifiers differ substantially from the moiré magnifiers having normal lenses described in the background art in the following features:

According to the background art, moiré magnifiers having normal lenses are assembled having two-dimensional lens and motif arrays, which arrays are characterized by two displacement vectors in different directions, which displacement vectors define a unit cell.

Cylindrical lens moiré magnifiers are assembled from lens and motif arrays that have only one displacement vector in one direction. Here, if a unit cell is constructed, it is bounded by two straight lines laid in any direction (except the direction of the displacement vector) through the end points of the displacement vector, and infinitely large.

In this way, motifs of any length can be accommodated in the cylindrical lens moiré magnifier without overlaps, while for moiré magnifiers having normal lenses according to the background art, one is limited to motifs that fit in the finitely large unit cell if one wants to avoid overlaps.

The moiré images can, as already discussed for moiré magnifiers having normal lenses, also appear three-dimensional with the cylindrical lens moiré magnifier upon suitable choice of the array grid parameters, and move when the arrangement is tilted in certain directions, since the virtual and real images that are visible through the lenses lie, according to the rules of geometric optics, behind or in front of the arrangement composed of lenses and motifs.

For illustration, FIG. 15(*a*) shows, schematically, a moiré magnifier 180 having an arrangement of micromotif elements 182 and spherical lenses 184 in a two-dimensional lattice arrangement wherein, as described above, all two-dimensional Bravais lattice arrangements shown in FIG. 4 may be used. The calculation of the lens grating and the motif grating occurs in accordance with the relationships (1) to (7) given above.

FIG. 15(*b*) shows, schematically, a moiré magnifier 190 having cylindrical lenses 194 in a line grating arrangement and an associated arrangement of micromotif elements 192. The relationships (1) to (7) can also be applied for such an arrangement if the following distinctive features are observed:

A cylindrical lens grating is formally obtained if one side length in the two-dimensional lattice cell is allowed to become infinitely large. For this, the lens grating $$W = \begin{pmatrix} w_{11} & w_{12} \\ w_{21} & w_{22} \end{pmatrix}$$

having the grating line spacing d and the cylinder direction $\phi$ is brought into the following form, wherein, without limiting the generality, for $\phi=0$, the cylinder direction shall lie in the direction of the y-axis.

$$W = \begin{pmatrix} \cos\phi & -\sin\phi \\ \sin\phi & \cos\phi \end{pmatrix} \cdot \begin{pmatrix} d & 0 \\ 0 & \infty \end{pmatrix} \quad W^{-1} = \begin{pmatrix} 1/d & 0 \\ 0 & 0 \end{pmatrix} \cdot \begin{pmatrix} \cos\phi & \sin\phi \\ -\sin\phi & \cos\phi \end{pmatrix}$$

Here, the motif grating U and the moiré grating T can also be formulated by $$U = \begin{pmatrix} u_{11} & u_{12} \\ u_{21} & u_{22} \end{pmatrix} \text{ and } T = \begin{pmatrix} t_{11} & t_{12} \\ t_{21} & t_{22} \end{pmatrix}.$$

The relationships calculated herewith below show that the components in the second column of these matrices do not occur in these relationships, which accommodates the fact that U and T are only simple translations in this type of moiré magnifier.

The relationship (6d) can now be rewritten such that the matrix W, which includes the symbol ∞ (infinity) in the notation indicated above, and is thus not suitable for calculations, can be replaced by the matrix $W^{-1}$, which can be used for calculation with no trouble.

$$A=(I-UW^{-1})^{-1}=TW^{-1}+I \qquad (6d')$$

With the relationship (6d'), the moiré movement and magnification matrix A can now be calculated from the lens matrix W and the motif matrix U:

$$A = \frac{1}{d-u_{11}\cos\phi - u_{21}\sin\phi}\begin{pmatrix} d-u_{21}\sin\phi & u_{11}\sin\phi \\ u_{21}\cos\phi & d-u_{11}\cos\phi \end{pmatrix}$$
$$= \frac{1}{d}\begin{pmatrix} d+t_{11}\cos\phi & t_{11}\sin\phi \\ -t_{21}\sin\phi & d+t_{21}\cos\phi \end{pmatrix}$$

Here, it is true that, at high magnification, as is generally the case with a moiré magnifier, for any tilt direction of the arrangement (horizontal, vertical or oblique, only tilting in the direction of the cylinder axis is an exception, in which case no movement results) almost precisely the direction of the displacement vector $$\vec{u}_1 = \begin{pmatrix} u_{11} \\ u_{21} \end{pmatrix}$$

always results as the movement direction. Also the displacement vector in the moiré image $$\vec{t}_1 = \begin{pmatrix} t_{11} \\ t_{21} \end{pmatrix}$$

has the same direction or the opposite direction. The movement direction upon tilting is then therefore $$\arctan(u_{21}/u_{11})=\arctan(t_{21}/t_{11}),$$

in relation to the x-axis, and the magnification in the direction of the displacement vector $\vec{t}_1$ is given by $$v = \frac{t_{11}}{u_{11}} = \frac{t_{21}}{u_{21}} = \frac{d}{d-u_{11}\cos\phi - u_{21}\sin\phi} = \frac{d+t_{11}\cos\phi + t_{21}\sin\phi}{d}$$

The magnification in the direction of the cylinder axes (so in the direction $\phi$) is 1.

When viewed with both eyes, the motif appears floating in front of the substrate plane when the magnification is negative, i.e. when d is less than $u_{11}\cos\phi + u_{21}\sin\phi$, and appears to lie behind the substrate plane when the magnification is positive, so when d is greater than $u_{11}\cos\phi + u_{21}\sin\phi$.

A motif having the desired coordinates X, Y is created distorted in the motif grid, $$\begin{pmatrix} x \\ y \end{pmatrix} = A^{-1}\begin{pmatrix} X \\ Y \end{pmatrix} = \frac{1}{d}\begin{pmatrix} d-u_{11}\cos\phi & -u_{11}\sin\phi \\ -u_{21}\cos\phi & d-u_{21}\sin\phi \end{pmatrix}\cdot\begin{pmatrix} X \\ Y \end{pmatrix}$$

applying to the coordinates x, y in the motif grid.

In a preferred special case, the lens grid lies vertically (parallel to the y-axis) such that $\phi=0$. In this way is obtained:

$$W = \begin{pmatrix} d & 0 \\ 0 & \infty \end{pmatrix},$$

$$W^{-1} = \begin{pmatrix} 1/d & 0 \\ 0 & 0 \end{pmatrix},$$

$$U = \begin{pmatrix} u_{11} & u_{12} \\ u_{21} & u_{22} \end{pmatrix},$$

$$A = \begin{pmatrix} \frac{d}{d-u_{11}} & 0 \\ \frac{u_{21}}{d-u_{11}} & 1 \end{pmatrix}.$$

From the form of the movement matrix A in a vertically arranged lens grating can be seen that:

When the moiré magnifier arrangement is tilted laterally, the motif applied in the lattice U moves in the direction $\arctan(u_{21}/d)$ with respect to the x-axis.

When the moiré magnifier arrangement is tilted vertically, no movement results.

When viewed with both eyes, the motif appears floating in front of the substrate plane when d is less than $u_{11}$, and appears to lie behind the substrate plane when d is greater than $u_{11}$.

In the x-direction, the magnification is $d/(d-u_{11})$.

In the y-direction, the magnification is 1.

The motif having the desired coordinates X, Y is created distorted in the motif grid, $$\begin{pmatrix} x \\ y \end{pmatrix} = A^{-1}\begin{pmatrix} X \\ Y \end{pmatrix} = \begin{pmatrix} \frac{d-u_{11}}{d} & 0 \\ -\frac{u_{21}}{d} & 1 \end{pmatrix}\cdot\begin{pmatrix} X \\ Y \end{pmatrix}$$

applying to the coordinates x, y in the motif grid.

Compared with the moiré magnifier having normal lenses, the moiré magnifier having cylindrical lenses has the advantage that motifs of any length, for example, character sequences or codes, can be accommodated.

Such a long motif element 200, for which the letter sequence "A B C D E F" is used in the figures by way of example, can be present in any directions and can be arranged, for example, vertically (FIG. 16(*a*)), horizontally (FIG. 16(*c*)), obliquely (FIG. 16(*e*)) or also along a curved line, as depicted in FIG. 17(*a*).

In the moiré-magnified image 202, the long motif element 200 then repeats periodically, each time undistorted, with the displacement vector $$\vec{t}_1\begin{pmatrix} t_{11} \\ t_{21} \end{pmatrix} = \frac{d}{d-u_{11}\cos\phi - u_{21}\sin\phi}\begin{pmatrix} u_{11} \\ u_{21} \end{pmatrix},$$

as depicted in FIGS. 16(*b*), 16(*d*), 16(*f*) and 17(*b*).

Figure 15A:
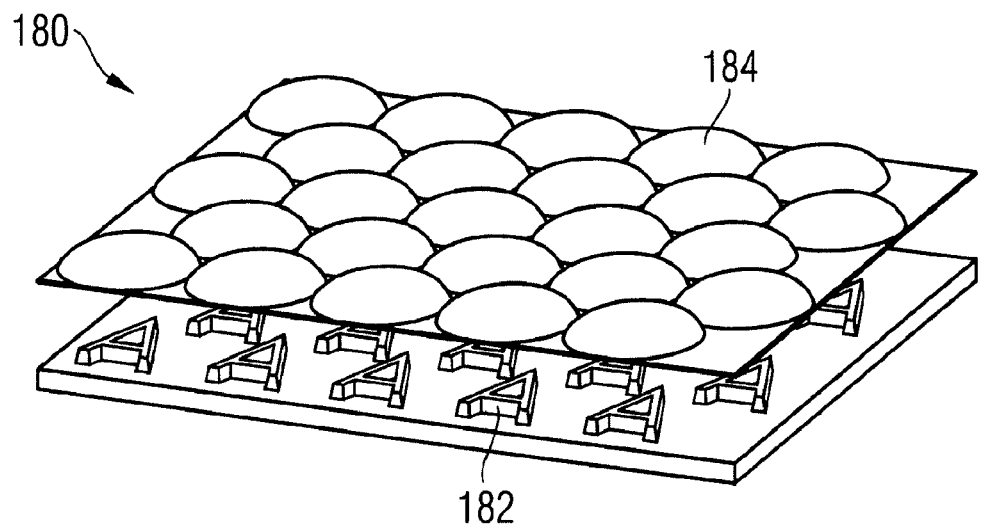
Figure 15B:
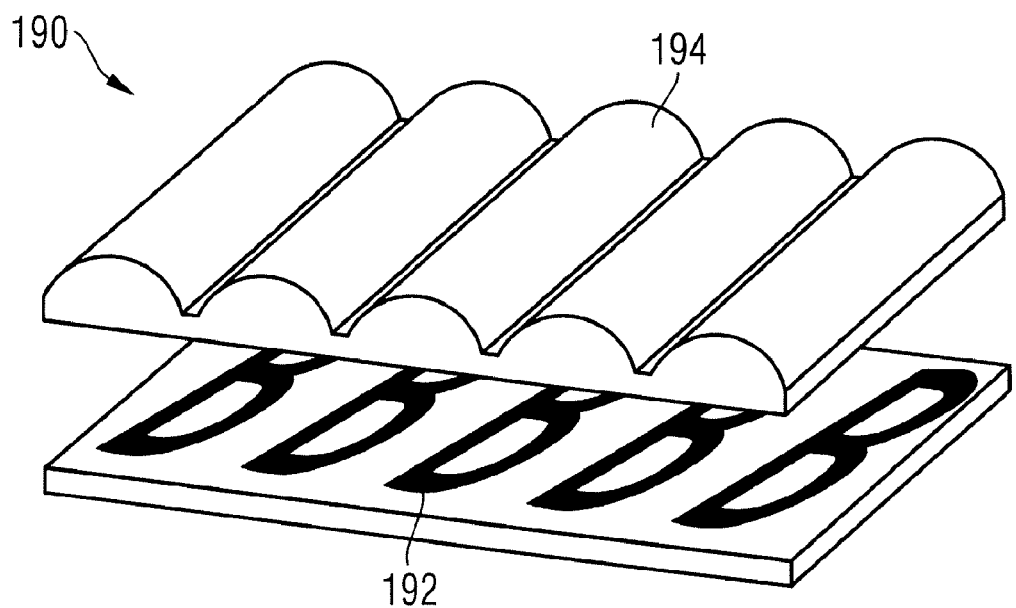

This visual appearance of the moiré-magnified image 202 is achieved with a moiré magnifier in which the micromotif element 204 distorted with the matrix $$A^{-1} = \frac{1}{d}\begin{pmatrix} d-u_{11}\cos\phi & -u_{11}\sin\phi \\ -u_{21}\cos\phi & d-u_{21}\sin\phi \end{pmatrix},$$

depicted in FIG. 18(a), is arranged periodically with the displacement vector $$\vec{u}_1 = \begin{pmatrix} u_{11} \\ u_{21} \end{pmatrix}$$

as the motif grid 206, as shown in FIG. 18(b), and in which the motif grid 206 is viewed through a cylindrical lens grid having lens spacing d and axis direction φ, as shown in FIG. 15(b).

A preferred approach will now be described for choosing the parameters for a moiré magnifier having cylindrical lenses:

First, a cylindrical lens grid having lens spacing d is chosen.

Then, an appropriate motif is defined that is to appear in the moiré-magnified image. The desired height and desired width b of the motif is thus defined.

Further, it is defined how the motif is to move. Here, the movement direction is approximately identical to the direction in which the motif is arranged in the motif array. In this way, $u_{21}/u_{11}=t_{21}/t_{11}$ is defined.

The position for the lens grid, i.e. the angle φ, can be defined arbitrarily, with the restriction that φ advantageously does not lie in the direction arctan $(u_{21}/u_{11})$. In order not to have to apply to strongly distorted motifs in the motif grid, the difference between the lens cylinder direction and the movement direction should be between 30° and 90°.

For a motif to fit in the grid without overlaps, the desired motif is created with a displacement in a drawing program and the magnitude of the displacement $t_{11}$, $t_{21}$ is defined such that overlaps are avoided. With the now defined variables d, φ, $t_{11}$, $t_{21}$, v, $u_{11}$, $u_{21}$ can be defined using the relationship $$v = \frac{t_{11}}{u_{11}}$$
$$= \frac{t_{21}}{u_{21}}$$
$$= \frac{d}{d - u_{11}\cos\phi - u_{21}\sin\phi}$$
$$= \frac{d + t_{11}\cos\phi + t_{21}\sin\phi}{d}.$$

The magnification v is negative when d is less than $u_{11}$ cos φ+$u_{21}$ sin φ. When viewed with both eyes, the motif appears to float in front of the substrate plane. The motif appears to lie behind the substrate plane when d is greater than $u_{11}$ cos φ+$u_{21}$ sin φ, so when the magnification is positive.

Now all data $u_{11}$, $u_{21}$, d, φ for the cylindrical lens moiré magnifier is available and the distortion matrix $A^{-1}$ can be calculated, which is needed to calculate from the desired image the image to be created in the motif array.

As described above, from the coordinates X,Y of a point in the desired image, the coordinates x,y of the corresponding point in the motif grid are now obtained through the transformation $$\begin{pmatrix} x \\ y \end{pmatrix} = A^{-1} \begin{pmatrix} X \\ Y \end{pmatrix}$$
$$= \frac{1}{d} \begin{pmatrix} d - u_{11}\cos\phi & -u_{11}\sin\phi \\ -u_{21}\cos\phi & d - u_{21}\sin\phi \end{pmatrix} \cdot \begin{pmatrix} X \\ Y \end{pmatrix}.$$

This calculation is carried out for all points of the desired image. The calculation can occur in the computer if the desired image is present as a bitmap or as a vector graphic in a suitable computer format. The thus calculated x-y image is arranged periodically, displaced with the displacement vector $$\vec{u}_1 = \begin{pmatrix} u_{11} \\ u_{21} \end{pmatrix},$$

producing the motif grid.

Compared with a moiré magnifier having normal lenses in the shape described in the background art, such a cylindrical lens moiré magnifier has the further advantage that the moiré images are sharper and higher contrast, since the magnification unsharpness comes in only in the direction perpendicular to the cylinder direction, and the images in the cylinder direction are as sharp as printed.

In the following, some specific calculation examples are given to illustrate the principles and approaches described above.

EXAMPLE 1

A moiré magnifier structure is to have a thickness of approximately 30 μm. To achieve this, the cylindrical lens spacing d is 30 μm. In the moiré-magnified image, long, vertically arranged letter sequences are to move obliquely at 35° with respect to the x-axis when tilted laterally. The letters are to appear lying behind the substrate plane when viewed with both eyes. The letters in the moiré-magnified image are to have a height of about 3 mm.

This results in:
Lens grid data: $w_{11}$=d=0.03 mm, φ=0°
Motif grid data: $u_{11}$=0.0297 mm, $u_{21}$=0.0207962 mm
Distortion matrix:

$$A^{-1} = \begin{pmatrix} 0,01 & 0 \\ -0,693205 & 1 \end{pmatrix}$$

EXAMPLE 2

Specifications as in example 1, but the letters are to float in front of the substrate plane when viewed with both eyes.
This results in:
Lens grid data: d=0.03 mm, φ=0°
Motif grid data: $u_{11}$=0.0303 mm, $u_{21=0.0212163}$ mm,
Distortion matrix:

$$A^{-1} = \begin{pmatrix} -0,01 & 0 \\ -0,70721 & 1 \end{pmatrix}$$

having laterally inverted letters

EXAMPLE 3

Specifications as in example 1, but the letter sequences are to move vertically when the moiré magnifier is tilted in any direction, and appear to lie behind the substrate plane.

This results in:
Lens grid data: d=0.03 mm, $\phi p$=45°
Motif grid data: $u_{11}$=0 mm, $u_{21}$=0.0420021 mm,
Distortion matrix:

$$A^{-1} = \begin{pmatrix} 1 & 0 \\ -0,99 & 0,01 \end{pmatrix}$$

EXAMPLE 4

Specifications as in example 1, but the letter sequences are to move horizontally when the moiré magnifier is tilted in any direction, and appear to lie in front of the substrate plane.
This results in:
Lens grid data: d=0.03 mm, $\phi$=45°
Motif grid data: $u_{11}$=0.0428507 mm, $u_{21}$=0 mm
Distortion matrix:

$$A^{-1} = \begin{pmatrix} -0,01 & -1,01 \\ 0 & 1 \end{pmatrix}$$

having laterally inverted letters

EXAMPLE 5

Specifications as in example 1, but with two different letter sequences that move interpenetratingly when the moiré magnifier is tilted laterally. The first letter sequence is to appear to float in front of the substrate plane, and the second letter sequence to appear to lie behind the substrate plane.
This results in, for the first letter sequence at a movement direction of 35°:
Lens grid: d=0.03 mm, $\phi$=0°
Motif grid: $u_{11}$=0.0303 mm, $u_{21}$=0.0212163 mm,
Distortion matrix:

$$A^{-1} = \begin{pmatrix} -0,01 & 0 \\ -0,70721 & 1 \end{pmatrix}$$

(laterally inverted letters)
and for the second letter sequence at a movement direction of −35°:
Lens grid: d=0.03 mm, $\phi$=0°
Motif grid: $u_{11}$=0.0297 mm, $u_{21}$=−0.0207962 mm,
Distortion matrix:

$$A^{-1} = \begin{pmatrix} -0,01 & 0 \\ 0,693205 & 1 \end{pmatrix}$$

In the moiré magnifiers, especially the following developments are possible:
The lenses in the moiré magnifier (this applies both to the two-dimensional Bravais lattice arrangement and to cylindrical lenses) can be executed as normal optical lenses or lens systems composed of refractive media, but also as Fresnel lenses, as elements of gradient refractive index (GRIN), as diffractive elements having a lens effect, as holographic elements having a lens effect, as zone plates or realized through other measures having image-forming properties. For example, when the motif grating is executed to be transparent, a cylindrical mirror grating arranged behind the motif plane can be used, similar to how normal concave mirrors, Fresnel mirrors, diffractive focusing mirrors, etc. can be used in a normal moiré magnifier.

For the two-dimensional Bravais lattice arrangement, as described above, also circular apertures may be used, and accordingly for cylindrical lenses, slit apertures, the spacing of the aperture plane from the motif plane advantageously being approximately identical to the spacing of the apertures lying next to each other in the grid.

Accordingly, the term microfocusing elements is also intended to encompass image-forming systems without focusing effect, such as circular and slit apertures.

The measures for producing curved moiré magnifiers described below also apply to moiré magnifiers having cylindrical lenses.

Moiré magnifiers that behave according to the formulas listed here can be executed as a composite of lens grids and motif grids, or as separate lens grids and motif grids, the viewer, in the latter case, laying the lens grid on the motif grid to see the moiré effect.

Moiré magnifiers in foil form can be manufactured, for example, according to the methods described in the German patent applications 10 2005 007 749.8 and 10 2005 028 162.1 or in the international application PCT/EP2006/001169. The disclosure of the cited publications is incorporated in full in the present application, and especially to the extent that they relate to the manufacture of the moiré magnifiers in foil form.

For illustration, FIG. 19 depicts a comparison of the distortion ratios in a cylindrical lens moiré magnifier and a moiré magnifier having normal lenses.

Here, FIG. 19(a) shows a letter 210 "E" in the desired image of a moiré-magnified image, the letter 210 being intended to exhibit, for illustration, a height 212 in the y-direction of 1 mm and a line width 214 of 0.1 mm. Here, the line width in the x- and y-direction is identical.

FIG. 19(b) shows the size ratios for the associated micromotif element 220 in the motif image for a design in which is present the moiré magnifier magnified 100× and a normal lens grid as depicted in FIG. 15(a). The letter height 222 and the line widths 224 in the x- and y-direction must then each be executed shrunk by a factor of 100 such that the letter height 222 in the micromotif image is 10 μm and the line width 224 is 1 μm in each case.

FIG. 19(c) shows the size ratios for the associated micromotif element 230 in the motif image when a cylindrical lens moiré magnifier according to FIG. 15(b) is used, which is likewise intended to magnify 100×. In the cylindrical lens moiré magnifier, the letter height 232 and the line width in the y-direction 234 remains unchanged and is thus 1 mm or 0.1 mm. The letter width and the line width in the x-direction 236 must, in contrast, be decreased by a factor of 100. The micromotif elements 230 of the micromotif image are thus present having very different line widths and line lengths.

These different line widths and line lengths can be reliably produced, for example, in that the micromotif elements are designed screened, as illustrated with the line grid design 240 in FIG. 19(d) and the dot grid design 244 in FIG. 19(e). Here, the line widths and point sizes of the sub-lines 242 and of the grid points 246 are coordinated with the smallest occurring line widths; wider and longer lines are produced by arranging a plurality of individual lines 242 or grid points 246 next to each other or on top of each other, as illustrated in FIGS. 19(d) and (e).

The lens grid and the motif grid need not be locally constant. The variables $t_{11}, t_{21}, u_{11}, u_{21}, d, \phi$ can also vary location dependently in such a way that different predeterminable magnifications, distortions and/or different movement behavior result at different locations in the moiré image. For a location-dependent change in one or more of the variables $t_{11}$, $t_{21}$, $u_{11}$, $u_{21}$, $d$, $\phi$, also the matrix $A^{-1}$ $$A^{-1} = \frac{1}{d}\begin{pmatrix} d - u_{11}\cos\phi & -u_{11}\sin\phi \\ -u_{21}\cos\phi & d - u_{21}\sin\phi \end{pmatrix}$$

becomes location dependent. This location-dependent $A^{-1}$ is used to calculate the location-dependent distortion of the shrunken motif to be created in the motif array. As described above, from the coordinates X,Y of a point in the desired image, the coordinates x,y of the corresponding point in the motif grid are obtained through the transformation $$\begin{pmatrix} x \\ y \end{pmatrix} = A^{-1}\begin{pmatrix} X \\ Y \end{pmatrix}$$
$$= \frac{1}{d}\begin{pmatrix} d - u_{11}\cos\phi & -u_{11}\sin\phi \\ -u_{21}\cos\phi & d - u_{21}\sin\phi \end{pmatrix} \cdot \begin{pmatrix} X \\ Y \end{pmatrix}.$$

The calculation is carried out for all points of the desired image. The calculation can occur in the computer if the desired image is present as a bitmap or as a vector graphic in a suitable computer format. The thus calculated x-y image is arranged repeatedly displaced with the, if applicable, location-dependent displacement vector $$\vec{u}_1 = \begin{pmatrix} u_{11} \\ u_{21} \end{pmatrix}$$

thus producing the motif grid.

For illustration, FIG. 20 shows a moiré magnifier 250 having a locally varying cylindrical lens grid 252, while FIG. 15(b) shows a locally constant cylindrical lens grid 194.

Such grid types can be manufactured on a foil in that an embossing stamp is first provided that includes a female mold of the required lens grid. With the aid of this embossing mold, an embossing is made in a lacquer layer that is applied on the foil that is to be provided with the lens grid. The lacquer layer can be, for example, thermoplastic or UV-curing. Appropriate methods are known to persons skilled in the art and are described in the background art.

Various methods for manufacturing the embossing mold can also be found in the background art; here some examples that can be used also for cylindrical lens moiré magnifiers just as for moiré magnifiers having normal lenses:
1) By means of a suitable stylus, in a computer-controlled mechanical precision engraving system, the desired lens grid or the female mold is cut into suitable material.
2) By means of computer-controlled laser ablation, the desired lens grid is engraved in a laser-machinable layer. A metallic female mold embossing stamp is obtained through galvanic deposition of a nickel layer.
3) In a variant of the so-called "thermal reflow process," a photoresist layer is ablated with electron beam or laser engraving in such a way that a mesa structure 260 is created, as shown in FIG. 21. For systematically executed heating and for an appropriately adjusted mesa structure, the structure flows in such a way that domed structures are created that exhibit the desired lens shape in FIGS. 15(a), 15(b) or 20. Through galvanic casting, a female mold is obtained.

Exemplary Embodiments with Moiré Magnifier Arrangements Having Expansive Motifs and Non-Cylindrical Lenses:

All moiré magnifiers described in the background art are assembled from a two-dimensional lens array composed of homogeneous lenses and an adjusted motif array composed of identical motifs. Here, the motif cannot be larger than the surface available under a lens in the array.

Motifs arbitrarily expanded in one direction can be accommodated in the cylindrical lens moiré magnifiers described above. Here, too, the magnifiers under each lens of the cylindrical lens array include a complete, if shrunken and distorted, image of the motif to be depicted.

In the following, a further method is described to accommodate expansive motifs in a moiré magnifier:

This further moiré magnifier variant behaves like a cylindrical lens moiré magnifier, but can, like a normal moiré magnifier, include a normal lens grid having spherical lenses 184, as shown in FIG. 15(a). For this, instead of the motif array 182 in FIG. 15(a), an array composed of elongated motifs is used that, as in the cylindrical lens moiré magnifier, are designed for 1:1 imaging (magnification factor 1) in one direction and for a predefined moiré magnification (magnification factor>1) in another direction.

Figures 23A, 23B:
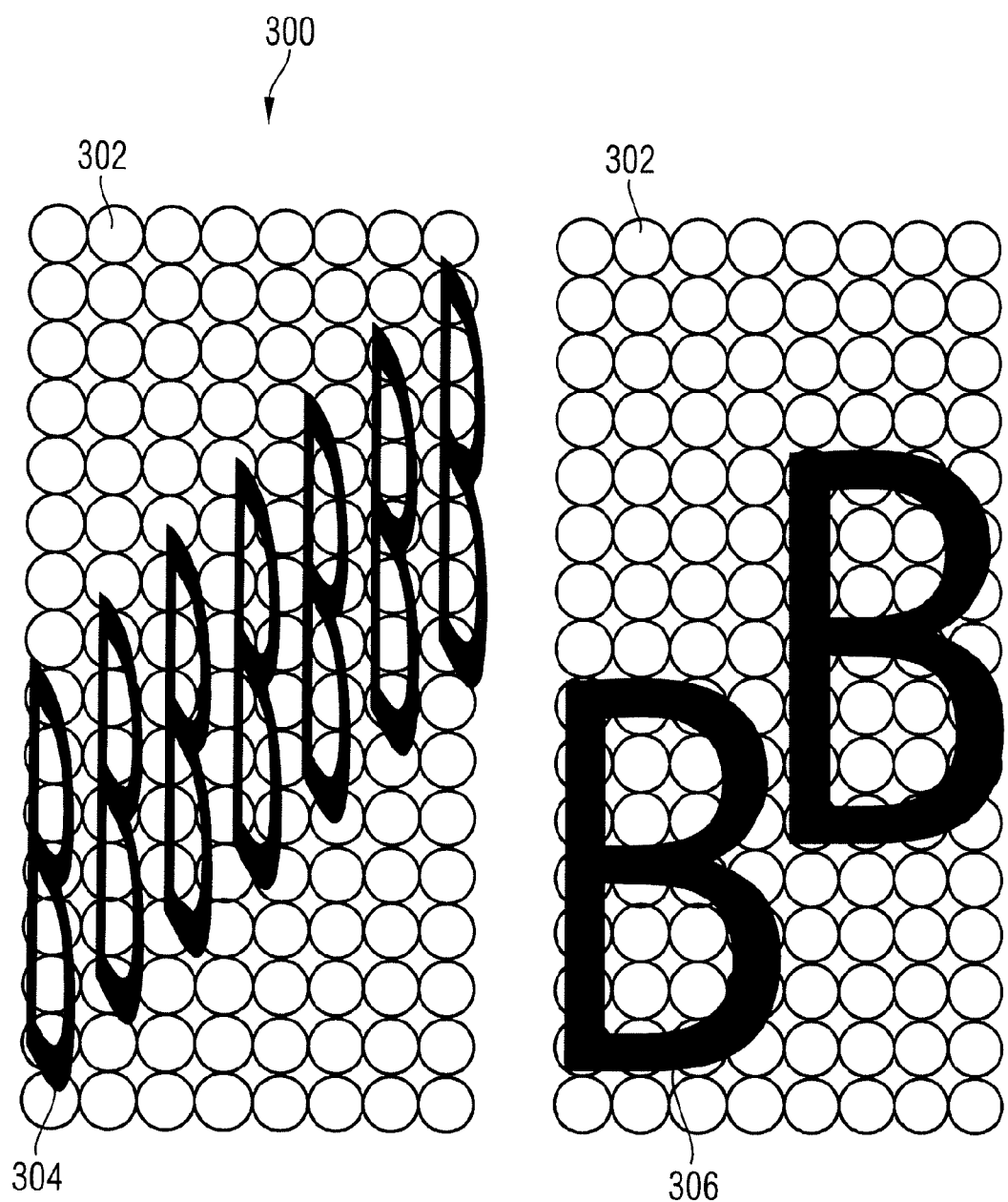

FIG. 23(a) shows, schematically, a top view of such a moiré magnifier arrangement 300 that illustrates the relative position and size of the array composed of spherical lenses 302 and the elongated micromotif elements 304. FIG. 23(b) shows how a viewer sees the chosen motif 306, here the letter "B", undistorted in the moiré image when the motif grid 304 having distorted letter "B"s and the lens grid 302, as indicated in FIG. 23 (a), are stacked.

To illustrate the calculation steps, a normal lens grating $$W = \begin{pmatrix} w_{11} & w_{12} \\ w_{21} & w_{22} \end{pmatrix}$$

is used, as well as a motif grating $$U = \begin{pmatrix} u_{11} & u_{12} \\ u_{21} & u_{22} \end{pmatrix}$$

that is designed for a moiré magnification in a direction $\psi$. In another direction, 1:1 mapping is to be present. The motif lattice cell is degenerated with the zero vector as a side vector. The other side vector represents a translation repeat of length b in the direction $\psi$.

Such a lattice U is described by $$U = \begin{pmatrix} b \cdot \cos\psi & 0 \\ b \cdot \sin\psi & 0 \end{pmatrix} = \begin{pmatrix} u_{11} & 0 \\ u_{21} & 0 \end{pmatrix} \tag{N1}$$

To calculate the matrix A or $A^{-1}$ for such a motif grid U and for any lens grid W, formula (6d) is applied $$A = W \cdot (W-U)^{-1} \quad A = (W-U) \cdot W^{-1}$$

and one obtains $$A^{-1} = \frac{1}{\text{Det}W}\begin{pmatrix} \text{Det}W - u_{11}w_{22} & u_{11}w_{12} \\ -u_{21}w_{22} & \text{Det}W + u_{21}w_{12} \end{pmatrix} \quad \text{(N2a)}$$

$$A = \frac{1}{\text{Det}(W-U)}\begin{pmatrix} \text{Det}W + u_{21}w_{12} & -u_{11}w_{12} \\ u_{21}w_{22} & \text{Det}W - u_{11}w_{22} \end{pmatrix} \quad \text{(N2b)}$$

with the determinants $\text{Det}W = w_{11}w_{22} - w_{12}w_{21}$, and $\text{Det}(W-U) = w_{11}w_{22} - w_{12}w_{21} - u_{11}w_{22} + w_{12}u_{21}$ In the special case $\psi=0$, $u_{21}=0$, $$U = \begin{pmatrix} u_{11} & 0 \\ 0 & 0 \end{pmatrix} \quad \text{(N3a)}$$

$$A^{-1} = \begin{pmatrix} 1 - \frac{u_{11}w_{22}}{\text{Det}W} & -\frac{u_{11}w_{12}}{\text{Det}W} \\ 0 & 1 \end{pmatrix}$$

$$A = \begin{pmatrix} \frac{\text{Det}W}{\text{Det}W - u_{11}w_{22}} & \frac{u_{11}w_{12}}{\text{Det}W - u_{11}w_{22}} \\ 0 & 1 \end{pmatrix} \quad \text{(N3b)}$$

applies.

Another interesting special case is present when a vector of the lens grating lies in the x-direction, so $w_{21}=0$:

$$U = \begin{pmatrix} u_{11} & 0 \\ u_{21} & 0 \end{pmatrix}, W = \begin{pmatrix} w_{11} & w_{12} \\ 0 & w_{22} \end{pmatrix},$$

so that $\text{Det}W = w_{11}w_{22}$, and $$A^{-1} = \begin{pmatrix} 1 - \frac{u_{11}}{w_{11}} & \frac{u_{11}w_{12}}{w_{11}w_{22}} \\ -\frac{u_{21}}{w_{11}} & 1 \end{pmatrix}. \quad \text{(N4)}$$

A further special case corresponds to the situation depicted in FIG. 23, in which the lens grating lies in the x-y-direction, so $w_{12}=0$, $w_{21}=0$. Then, $$U = \begin{pmatrix} u_{11} & 0 \\ u_{21} & 0 \end{pmatrix}, W = \begin{pmatrix} w_{11} & 0 \\ 0 & w_{22} \end{pmatrix}, \text{Det}W = w_{11}w_{22}, \quad \text{(N5)}$$

$$A^{-1} = \begin{pmatrix} 1 - \frac{u_{11}}{w_{11}} & 0 \\ -\frac{u_{21}}{w_{11}} & 1 \end{pmatrix}, A = \begin{pmatrix} \frac{w_{11}}{w_{11}-u_{11}} & 0 \\ \frac{u_{21}}{w_{11}-u_{11}} & 1 \end{pmatrix}$$

applies.

In a further special case, U lies in the x-direction, W lies in the x- and y-direction, such that:

$$U = \begin{pmatrix} u_{11} & 0 \\ 0 & 0 \end{pmatrix},$$

$$W = \begin{pmatrix} w_{11} & 0 \\ 0 & w_{22} \end{pmatrix},$$

$$A = \begin{pmatrix} \frac{w_{11}}{w_{11}-u_{11}} & 0 \\ 0 & 1 \end{pmatrix},$$

$$A^{-1} = \begin{pmatrix} 1 - \frac{u_{11}}{w_{11}} & 0 \\ 0 & 1 \end{pmatrix}$$

applies.

Beyond these illustrative special cases, the lattice matrix T=A U for the emerging moiré image having U from the relationship (N1) and A from the relationship (N2b) is generally given by:

$$T = \begin{pmatrix} t_{11} & 0 \\ t_{21} & 0 \end{pmatrix}$$

The repeat $$\bar{t}_1 = \begin{pmatrix} t_{11} \\ t_{21} \end{pmatrix}$$

of the emerging moiré image lies in the same or opposite direction $$\text{as } \bar{u}_1 = \begin{pmatrix} u_{11} \\ u_{21} \end{pmatrix}.$$

This is also the direction in which the motif moves when the moiré magnifier arrangement is tilted. In this direction, the magnification factor is given by $$v = \frac{t_{11}}{u_{11}} \quad \text{(N6)}$$

$$= \frac{t_{21}}{u_{21}}$$

$$= \frac{\text{Det}W}{\text{Det}(W-U)}$$

$$= \frac{w_{11}w_{22} - w_{12}w_{21}}{w_{11}w_{22} - w_{12}w_{21} - u_{11}w_{22} + W_{12}u_{21}}$$

$$= \frac{\text{Det}W}{\text{Det}(W+T)}$$

$$= \frac{w_{11}w_{22} - w_{12}w_{21}}{w_{11}w_{22} - w_{12}w_{21} - t_{11}w_{22} + W_{12}t_{21}}$$

With these relationships, $t_{11}$, $t_{21}$ and $u_{11}$, $u_{21}$ can be converted into one another. Upon viewing with both eyes, the motif appears floating in front of the substrate plane when v is positive, and to lie behind the substrate plane when v is negative.

In a preferred approach for choosing the parameters for such a moiré magnifier, the following is done:

First, the appropriate motif X,Y is chosen as it is to appear in the moiré. For example, the motif can be chosen as in FIG. 17(*a*).

Then it is defined how the motif is to move. The movement direction ψ is equal to the direction of the translation vectors, wherein tan ψ=$u_{21}/u_{11}=t_{21}/t_{11}$.

For a motif to fit in the matrix without overlaps, the desired motif X,Y and the moiré displacement $t_{11}, t_{21}$ are created in a drawing program and the motif and displacement are defined such that overlaps are avoided, see FIG. 17(*b*) for illustration.

Now a lens grid is chosen.

With the aid of the mathematical composition (N6), the motif translation $u_{11}, u_{21}$ can be calculated from the moiré displacement $t_{11}, t_{21}$.

Then the distortion matrix $A^{-1}$ is calculated.

With the distortion matrix, the motif x,y to be created is calculated from the coordinates X,Y of the desired motif:

$$\begin{pmatrix} x \\ y \end{pmatrix} = A^{-1} \begin{pmatrix} X \\ Y \end{pmatrix}$$

If the desired motif is present, for example, as a vector file or bitmap, then the calculation can be carried out with a computer. FIG. 18(*a*) shows what the result can look like.

The thus calculated motif to be created is arranged repeatedly displaced with the translation vector $u_{11}, u_{21}$, as shown in FIG. 18(*b*).

If the motif array produced in this way is viewed through the lens array underlying the calculation, the desired motif is seen as a moiré. FIG. 23 shows a section, with FIG. 23(*b*) showing the visual appearance of the letter "B"s in the moiré when the motif grid and lens grid are stacked as indicated in FIG. 23(*a*).

The methods described below for curved moiré magnifiers can, of course, also be used in the moiré magnifier variant just discussed.

Exemplary Embodiments with Curved moiré Magnifier Arrangements:

With reference to FIGS. 12 to 14, some exemplary embodiments will now be explained to illustrate curved moiré magnifier arrangements.

If a planarly calculated moiré magnifier that exhibits a motif array on one side and a lens array on the other side of a flexible foil is curved or bent, then the visual appearance of the motif changes. According to the present invention, this effect is systematically used in that the motif image is calculated such that it changes in the desired manner when the foil is bent or curved.

Here, the appearance of an image motif that is already visible in the planar state can change, or the image motif can appear or disappear only when the foil is bent or curved. Such a curved moiré magnifier can thus be used as a hidden feature for securing documents.

The exemplary embodiment in FIG. 12 shows a moiré magnifier 150 that, in the planar state, displays no motif, but rather just a row of parallel strips 152, as depicted in FIG. 12(*a*). If the moiré magnifier 150 is bent convexly, the prechosen motif 154 appears, in the exemplary embodiment an array composed of letter "B"s, as shown in FIG. 12(*b*). If, on the other hand, the foil having the moiré magnifier 150 is bent concavely, as depicted in FIG. 12(*c*), then the prechosen motif appears in mirror-reversed depiction 156. Undistorted depictions result in each case for a predefined positive or negative bending radius, and distorted motif images result for other bending radii.

To illustrate the calculation steps, a simple, orthogonally oriented lens grid is assumed in which the lenses have a spacing of 30 μm, so $$W = \begin{pmatrix} 30 \text{ μm} & 0 \\ 0 & 30 \text{ μm} \end{pmatrix}.$$

A motif B is to be 20 μm high and, in the planar state, arranged in a grid $U_1$ that is given by the grid matrix $$U_1 = W - A^{-1}W \text{ with } A^{-1} = \begin{pmatrix} 0 & 0 \\ 0 & 0.01 \end{pmatrix}.$$

The lens and motif array are applied on opposing sides of a flexible, 30 μm thick foil. In a thus constructed moiré magnifier 150, in the planar state, only the strips 152 in FIG. 12(*a*) appear, and an image motif is not perceptible.

To be able to incorporate a bend, bending matrices are defined. For the bending of the lens grid and the motif grid in the horizontal direction, these are given by lens bending $$V_L = \begin{pmatrix} 1 \pm \dfrac{d}{2r} & 0 \\ 0 & 1 \end{pmatrix},$$

motif bending $$V_M = \begin{pmatrix} 1 \mp \dfrac{d}{2r} & 0 \\ 0 & 1 \end{pmatrix}$$

wherein r represents the bending radius and d the foil thickness. The positive or negative signs apply to convex or concave bending. Then, in the bent state, there results for the magnification matrix $$A' = (I - V_M(I - A^{-1})V_L^{-1})^{-1}.$$

For a bending radius of 3 mm, there thus results for the convex bending in FIG. 12(*b*)

$$A' = \left(I - \begin{pmatrix} 0.995 & 0 \\ 0 & 1 \end{pmatrix} \cdot \begin{pmatrix} 1 & 0 \\ 0 & 0.99 \end{pmatrix} \cdot \begin{pmatrix} 0.995025 & 0 \\ 0 & 1 \end{pmatrix}\right)^{-1}$$

$$= \begin{pmatrix} 100.5 & 0 \\ 0 & 100 \end{pmatrix}$$

and for the concave bending shown in FIG. 12(*c*), $$A' = \left(I - \begin{pmatrix} 1.005 & 0 \\ 0 & 1 \end{pmatrix} \cdot \begin{pmatrix} 1 & 0 \\ 0 & 0.99 \end{pmatrix} \cdot \begin{pmatrix} 1.00503 & 0 \\ 0 & 1 \end{pmatrix}\right)^{-1}$$

$$= \begin{pmatrix} -99.5 & 0 \\ 0 & 100 \end{pmatrix}.$$

As can be seen from the modified magnification matrix A', the moiré magnifier bent convexly with a bending radius of 3 mm displays the motif right reading and magnified 100 times, while the moiré magnifier bent concavely with a bending radius of 3 mm likewise displays the motif magnified 100 times, but laterally inverted. If the letter "B"s in the motif image are 20 µm high, they thus appear 2 mm high when bent.

Furthermore, when viewed with both eyes and bent convexly, the motif appears to lie behind the foil plane, while, when bent concavely, it appears to lie in front of the foil plane.

Figure 13A:
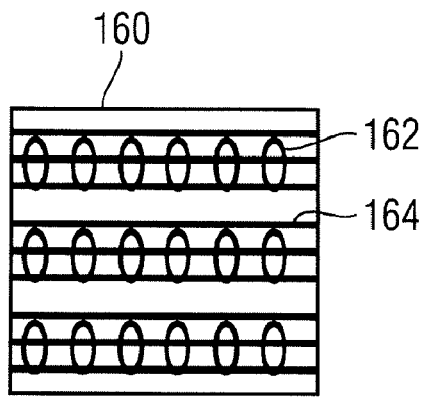

In the exemplary embodiment in FIG. 13, a planar motif component is supplemented by a motif portion that becomes visible only when the moiré magnifier 160 is bent. Here, the moiré magnifier 160 in FIG. 13(a) is depicted in the planar state, in which an array 162 of letter "O"s appears in front of a stripe background 164.

Figure 13B:
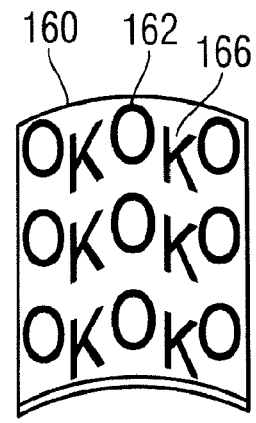

In FIG. 13(b), the moiré magnifier 160 is depicted in the bent state. Here, between the letter "O"s appear further motif components 166 composed of letter "K"s that, when the bending radius is changed, change their width and move relative to the letter "O"s.

Again with reference to a simple calculation example, such an embodiment can be obtained in that a lens grid $$W = \begin{pmatrix} 30\,\mu m & 0 \\ 0 & 30\,\mu m \end{pmatrix}$$

is specified. The motif letter "O"s are 20 µm high and arranged in a grid $U_1$ with $U_1 = W - A_1^{-1} W$, wherein $$A_1^{-1} = \begin{pmatrix} -0.0201 & 0 \\ 0 & 0.01 \end{pmatrix}.$$

The motif letter "K"s are likewise 20 µm high and arranged in a grid $U_2$ with $U_2 = W - A_2^{-1} W$, wherein $$A_2^{-1} = \begin{pmatrix} 0 & 0 \\ 0 & 0.01 \end{pmatrix}$$

Upon horizontal convex bending of the flexible 30 µm thick foil with a bending radius of 3 mm, there result the bending matrices $$V_L = \begin{pmatrix} 1.005 & 0 \\ 0 & 1 \end{pmatrix} \text{ and } V_M = \begin{pmatrix} 0.995 & 0 \\ 0 & 1 \end{pmatrix}.$$

For the motif letter "O"s is then obtained $$A_1' = \left(I - \begin{pmatrix} 0.995 & 0 \\ 0 & 1 \end{pmatrix} \cdot \begin{pmatrix} 1.0201 & 0 \\ 0 & 0.99 \end{pmatrix} \cdot \begin{pmatrix} 0.995025 & 0 \\ 0 & 1 \end{pmatrix} \right)^{-1}$$

$$= \begin{pmatrix} -100.5 & 0 \\ 0 & 100 \end{pmatrix},$$

such that the letter "O"s appear, when bent with a bending radius of 3 mm, magnified 100×, so 2 mm high, and when viewed with both eyes, float in front of the foil plane. For the motif letter "K"s is obtained $$A_2' = \left(I - \begin{pmatrix} 0.995 & 0 \\ 0 & 1 \end{pmatrix} \cdot \begin{pmatrix} 1 & 0 \\ 0 & 0.99 \end{pmatrix} \cdot \begin{pmatrix} 0.995025 & 0 \\ 0 & 1 \end{pmatrix} \right)^{-1}$$

$$= \begin{pmatrix} 100.5 & 0 \\ 0 & 100 \end{pmatrix},$$

such that the letter "K"s appear, when bent with a bending radius of 3 mm, magnified 100×, so likewise 2 mm high, and when viewed with both eyes, lie behind the foil plane.

Figure 14A:
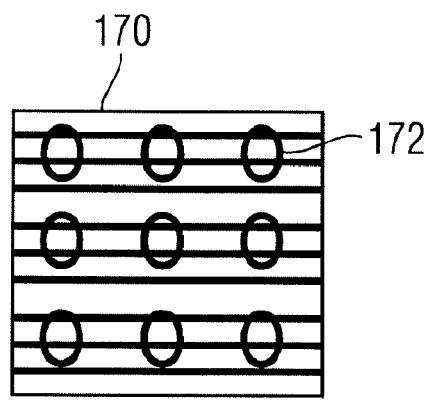
Figure 14B:
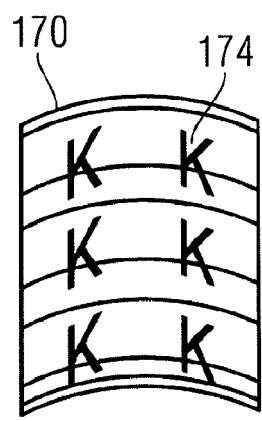

In the further exemplary embodiment in FIG. 14, in the planar state (FIG. 14(a)) of the moiré magnifier 170, a first motif 172 appears that, when the moiré magnifier is bent (FIG. 14(b)) in the predefined bending radius, is replaced by a second motif 174. For bending radii other than the predefined one, a blend of the two motifs is perceptible.

Also in the exemplary embodiment in FIG. 14, the lens grid W indicated above is assumed. The 20 µm high motif letter "O"s are arranged in a grid $U_1$ with $U_1 = W - A_1^{-1} W$, wherein $$A_1^{-1} = \begin{pmatrix} -0.01005 & 0 \\ 0 & 0.01 \end{pmatrix},$$

and the 20 µm high motif letter "K"s are arranged in a grid $U_2$ with $U_2 = W - A_2^{-1} W$, wherein $$A_2^{-1} = \begin{pmatrix} 0 & 0 \\ 0 & 0.01 \end{pmatrix}.$$

In the planar state in FIG. 14(a), the letter "O"s of the first motif 172 appear with 100× magnification, the letter "K"s of the second motif with infinite magnification, so are not visible.

Upon horizontal convex bending of the flexible 30 µm thick foil with the bending radius of 3 mm, there result the bending matrices $$V_L = \begin{pmatrix} 1.005 & 0 \\ 0 & 1 \end{pmatrix} \text{ and } V_M = \begin{pmatrix} 0.995 & 0 \\ 0 & 1 \end{pmatrix}.$$

In the bent state in FIG. 14(b), for the letter "O"s of the first motif then results:

$$A_1' = \left(I - \begin{pmatrix} 0.995 & 0 \\ 0 & 1 \end{pmatrix} \cdot \begin{pmatrix} 1.01005 & 0 \\ 0 & 0.99 \end{pmatrix} \cdot \begin{pmatrix} 0.995025 & 0 \\ 0 & 1 \end{pmatrix} \right)^{-1}$$

$$= \begin{pmatrix} 0 & 0 \\ 0 & 0.01 \end{pmatrix}^{-1}$$

$$= \begin{pmatrix} \infty & 0 \\ 0 & 100 \end{pmatrix}.$$

At this bending radius, the letter "O"s of the first motif 172 thus appear infinitely magnified and are thus not visible. In contrast, for the letter "K"s of the second motif 174, there results $$A_2' = \left(I - \begin{pmatrix} 0.995 & 0 \\ 0 & 1 \end{pmatrix} \cdot \begin{pmatrix} 1 & 0 \\ 0 & 0.99 \end{pmatrix} \cdot \begin{pmatrix} 0.995025 & 0 \\ 0 & 1 \end{pmatrix} \right)^{-1} = \begin{pmatrix} 100.5 & 0 \\ 0 & 100 \end{pmatrix},$$

in other words, the letter "K"s of the second motif 174 now appear magnified 100×. For bending radii other than the prechosen 3 mm, a blend of distorted letter "O"s and "K"s appears, the letter "O"s appearing for the viewer to float in front of the letter "K"s.

The following is intended to compile the necessary mathematical relationships for the illustrated bends and for general bends or curves of moiré magnifiers according to the present invention. Here, r always denotes the bending radius, d the foil thickness. Common assumptions regarding the bending behavior for the foil material are implied.

For convex or concave bending in the horizontal direction, the bending matrices $V_{L,M}$ are given by $$V_{L,M} = \begin{pmatrix} 1 \pm \frac{d}{2r} & 0 \\ 0 & 1 \end{pmatrix}. \tag{8}$$

For bending in the vertical direction, the bending matrices are given by $$V_{L,M} = \begin{pmatrix} 1 & 0 \\ 0 & 1 \pm \frac{d}{2r} \end{pmatrix}. \tag{9}$$

For cylindrical bending in any direction γ, the bending matrices are given by $$V_{L,M} = \begin{pmatrix} \cos\gamma & -\sin\gamma \\ \sin\gamma & \cos\gamma \end{pmatrix} \cdot \begin{pmatrix} 1 \pm \frac{d}{2r} & 0 \\ 0 & 1 \end{pmatrix} \cdot \begin{pmatrix} \cos\gamma & -\sin\gamma \\ \sin\gamma & \cos\gamma \end{pmatrix}^{-1}. \tag{10}$$

For spherical-cap-shaped bending, the bending matrices are given by $$V_{L,M} = \left(1 \pm \frac{d}{2r}\right) \cdot \begin{pmatrix} 1 & 0 \\ 0 & 1 \end{pmatrix}. \tag{11}$$

For any cap-shaped or saddle-shaped bending with the bending directions $$\vec{c}_1 = \begin{pmatrix} c_{11} \\ c_{12} \end{pmatrix} \text{ and } \vec{c}_2 = \begin{pmatrix} c_{21} \\ c_{22} \end{pmatrix},$$

the bending matrices are given by $$V_{L,M} = \begin{pmatrix} c_{11} & c_{21} \\ c_{12} & c_{22} \end{pmatrix} \cdot \begin{pmatrix} 1 \pm d/(2r_1) & 0 \\ 0 & 1 \pm d/(2r_2) \end{pmatrix} \cdot \begin{pmatrix} c_{11} & c_{21} \\ c_{12} & c_{22} \end{pmatrix}^{-1} \tag{12}$$

wherein $r_1$, $r_2$ are the bending radii and d is, again, the foil thickness.

If a movement and magnification behavior for the planar state is specified generally by a matrix A, then in the bent state, the movement and magnification matrix A' is obtained with $$A' = (I - V_M(I-A)V_L^{-1})^{-1} \tag{13}$$

If, on the other hand, a desired movement and magnification behavior in the bent state is specified by a matrix A', then in the planar state, the movement and magnification matrix must be created by:

$$A = (I - V_M^{-1}(I - A'^{-1})V_L)^{-1} \tag{14}$$

In the general case, a bending according to one of the formulas (8) to (12), a lens grid W and a desired movement and magnification behavior either before or after bending is preferably specified by a matrix A or A'. Then the necessary missing variables are calculated, especially the motif grid U according to formula (7) and the matrix A' or A according to formula (13) or (14).

Alternatively, other variable-matrices from the group W, U, A, A', T, $V_{L,M}$ can be specified and the necessary matrices calculated from the indicated matrix relationships. For this, the relationships (6), (7), (13) and (14) are solved differently, if necessary.

The considerations and formulas executed here for the curved moiré magnifier apply both to the moiré magnifier having normal lenses and to the cylindrical lens moiré magnifier.

The invention claimed is:

1. A security element for security papers, value documents and the like, having a micro-optical moiré magnification arrangement having
a motif image that consists of a periodic or at least locally periodic arrangement of a plurality of micromotif elements that is planar or applied on a curved surface, and
a periodic or at least locally periodic arrangement of a plurality of microfocusing elements that is planar or applied on a curved surface for moiré-magnified viewing of the micromotif elements of the motif image,
the arrangement of micromotif elements and/or the arrangement of microfocusing elements exhibiting, in the planar case, no symmetry axis in the plane of the arrangement in its periodic or at least locally periodic regions.

2. The security element according to claim 1, characterized in that both the plurality of micromotif elements and the plurality of microfocusing elements are arranged periodically.

3. The security element according to claim 2, characterized in that the periodicity length is between 3 μm and 50 μm, preferably between 5 μm and 30 μm, particularly preferably between about 10 μm and about 20 μm.

4. The security element according to claim 1, characterized in that the arrangement of micromotif elements and the arrangement of microfocusing elements each forms a two-dimensional Bravais lattice, the arrangement of micromotif elements forming a Bravais lattice having the symmetry of a parallelogram lattice.

5. The security element according to claim 4, characterized in that the lattice cells of the two Bravais lattices are described by a first side length $s_1$, a second side length $s_2$ and an angle σ in between, the parallelogram lattice of the micro-motif elements differing from the Bravais lattice of the micro-focusing elements in at least one of the lattice parameters $s_1$, $s_2$ and σ by 0.01% to 5%, preferably by 0.1% to 2%.

6. The security element according to claim 1, characterized in that the arrangement of micromotif elements and the arrangement of microfocusing elements each forms a two-dimensional Bravais lattice, the arrangement of microfocusing elements forming a Bravais lattice having the symmetry of a parallelogram lattice.

7. The security element according to claim 6, characterized in that the lattice cells of the two Bravais lattices are described by a first side length $s_1$, a second side length $s_2$ and an angle σ in between, the parallelogram lattice of the micro-focusing elements differing from the Bravais lattice of the micro-motif elements in at least one of the lattice parameters $s_1$, $s_2$ and σ by 0.01% to 5%, preferably by 0.1% to 2%.

8. The security element according to claim 1, characterized in that, locally, both the plurality of micromotif elements and the plurality of microfocusing elements are arranged periodically, the local period parameters changing only slowly in relation to the periodicity length.

9. The security element according to claim 8, characterized in that the local period parameters are periodically modulated across the dimension of the security element, the modulation period being especially at least 20 times, preferably at least 50 times, particularly preferably at least 100 times greater than the local periodicity length.

10. The security element according to claim 8, characterized in that the local periodicity length is between 3 µm and 50 µm, preferably between 5 µm and 30 µm, particularly preferably between about 10 µm and about 20 µm.

11. The security element according to claim 1, characterized in that, locally, the arrangement of micromotif elements and the arrangement of microfocusing elements each forms a two-dimensional Bravais lattice, the arrangement of micromotif elements locally forming a Bravais lattice having the symmetry of a parallelogram lattice.

12. The security element according to claim 11, characterized in that, locally, the lattice cells of the two Bravais lattices are each described by a first side length $s_1$, a second side length $s_2$ and an angle $\sigma$ in between, the parallelogram lattice of the micromotif elements differing from the Bravais lattice of the microfocusing elements in at least one of the lattice parameters $s_1$, $s_2$ and $\sigma$ by 0.01% to 5%, preferably by 0.1% to 2%.

13. The security element according to claim 1, characterized in that, locally, the arrangement of micromotif elements and the arrangement of microfocusing elements each forms a two-dimensional Bravais lattice, the arrangement of microfocusing elements locally forming a Bravais lattice having the symmetry of a parallelogram lattice.

14. The security element according to claim 13, characterized in that, locally, the lattice cells of the two Bravais lattices are each described by a first side length $s_1$, a second side length $s_2$ and an angle $\sigma$ in between, the parallelogram lattice of the microfocusing elements differing from the Bravais lattice of the micromotif elements in at least one of the lattice parameters $s_1$, $s_2$ and $\sigma$ by 0.01% to 5%, preferably by 0.1% to 2%.

15. The security element according to claim 1, characterized in that the microfocusing elements are formed by non-cylindrical microlenses, especially by microlenses having a circular or polygonally delimited base area.

16. The security element according to claim 1, characterized in that the motif image and the arrangement of microfocusing elements are arranged at opposing surfaces of an optical spacing layer.

17. The security element according to claim 1, characterized in that the arrangement of microfocusing elements is provided with a protective layer whose refractive index preferably differs from the refractive index of the microfocusing elements by at least 0.3.

18. The security element according to claim 1, characterized in that the total thickness of the security element is below 50 µm.

19. The security element according to claim 1, characterized in that the micromotif elements are present in the form of microcharacters or micropatterns.

20. The security element according to claim 1, characterized in that the micromotif elements are present in a printing layer.

21. The security element according to claim 1, characterized in that the shape and arrangement of the microfocusing elements and the shape and arrangement of the micromotif elements are coordinated with each other to prevent unused spaces in the magnified motif image.

22. The security element according to claim 1, characterized in that the security element further exhibits an opaque cover layer to cover the moirémagnification arrangement in some regions.

23. The security element according to claim 22, characterized in that the cover layer is present in the form of patterns, characters or codes, and/or exhibits gaps in the form of patterns, characters or codes.

24. The security element according to claim 23, characterized in that the cover layer comprises a printing layer or a reflection layer, especially a metal layer.

25. The security element according to claim 1, characterized in that the security element is a security thread, a tear strip, a security band, a security strip, a patch or a label for application to a security paper, value document or the like.

26. The security element according to claim 1, characterized in that the motif image and the arrangement of the microfocusing elements are designed such that the visual appearance of the moiré-magnified image changes when the security element is curved or bent.

27. The security element according to claim 26, characterized in that a predefined moiré-magnified image motif is not visible in the planar state of the security element and appears when the security element is curved or bent.

28. The security element according to claim 26, characterized in that a predefined moiré-magnified image motif is visible in the planar state of the security element and disappears when the security element is curved or bent.

29. The security element according to claim 26, characterized in that a predefined moiré-magnified image motif is visible in the planar state of the security element and is supplemented by a further predefined image motif when the security element is curved or bent.

30. The security element according to claim 26, characterized in that a first predefined moiré-magnified image motif is visible in the planar state of the security element and is replaced by a second predefined image motif when the security element is curved or bent.

31. A security paper for manufacturing security or value documents, such as banknotes, checks, identification cards, certificates or the like, that are furnished with a security element according to claim 1.

32. The security paper according to claim 31, characterized in that the security paper comprises a carrier substrate composed of paper or plastic.

33. A data carrier, especially a branded article, value document or the like, having a security element according to claim 1.

34. The data carrier according to claim 33, characterized in that the security element is arranged in a window region of the data carrier.

35. A use of the security element according to claim 1, of a security paper furnished with the security element, or of a data carrier having the security element for securing goods of any kind against counterfeiting.

36. A method for manufacturing a security element having a micro-optical moirémagnification arrangement, in which a motif image that consists of a periodic or at least locally periodic arrangement of a plurality of micromotif elements that is planar or applied on a curved surface, and a periodic or at least locally periodic arrangement of a plurality of microfocusing elements that is planar or applied on a curved surface, are arranged in such a way that the micromotif elements are perceptible in magnification when viewed through the microfocusing elements, and the arrangement of micromotif elements and/or the arrangement of microfocusing elements being chosen such that they exhibit, in the planar case, no symmetry axis in the plane of the arrangement in their periodic or at least locally periodic regions.

37. The method according to claim 36, characterized in that
a) a desired image that is visible when viewed and has one or more moiré image elements is defined, the arrangement of magnified moiré image elements being chosen in the form of a two-dimensional Bravais lattice whose lattice cells are given by vectors $\vec{t}_1$ and $\vec{t}_2$,
b) an arrangement of microfocusing elements is chosen in the form of a two-dimensional Bravais lattice whose lattice cells are given by vectors $\vec{w}_1$ and $\vec{w}_2$,
c) the motif image having the micromotif elements is calculated using the relationships $$\vec{U} = \vec{W} \cdot (\vec{T} + \vec{W})^{-1} \cdot \vec{T}$$

and $$\vec{r} = \vec{W} \cdot (\vec{T} + \vec{W})^{-1} \cdot \vec{R} + \vec{r}_0,$$

$$\vec{R} = \begin{pmatrix} X \\ Y \end{pmatrix}$$

representing an image point of the desired image, $$\vec{r} = \begin{pmatrix} x \\ y \end{pmatrix}$$

an image point of the motif image, $$\vec{r}_0 = \begin{pmatrix} x_0 \\ y_0 \end{pmatrix}$$

a displacement between the arrangement of microfocusing elements and the arrangement of micromotif elements, and the matrices $\vec{T}$, $\vec{W}$ and the motif grating matrix $\vec{U}$ being given by $$\vec{T} = \begin{pmatrix} t_{11} & t_{12} \\ t_{21} & t_{22} \end{pmatrix}, \vec{W} = \begin{pmatrix} w_{11} & w_{12} \\ w_{21} & w_{22} \end{pmatrix} \text{ and } \vec{U} = \begin{pmatrix} u_{11} & u_{12} \\ u_{21} & u_{22} \end{pmatrix},$$

with $t_{1i}$, $t_{2i}$, $u_{1i}$, $u_{2i}$ and $w_{1i}$, $w_{2i}$ representing the components of the lattice cell vectors $\vec{t}_i$, $\vec{u}_i$ and $\vec{w}_i$, where i=1,2.

38. The method according to claim 37, characterized in that the vectors $\vec{u}_1$ and $\vec{u}_2$, and $\vec{w}_1$ and $\vec{w}_2$ are modulated location-dependently, the local period parameters $|\vec{u}_1|$, $|\vec{u}_2|$, $\angle(\vec{u}_1, \vec{u}_2)$ and $|\vec{w}_1|$, $|\vec{w}_2|$, $\angle(\vec{w}_1, \vec{w}_2)$ changing only slowly in relation to the periodicity length.

39. The method according to claim 37, characterized in that the shape and arrangement of the microfocusing elements and the shape and arrangement of the micromotif elements are coordinated with each other in such a way that unused spaces in the magnified motif image are avoided.

40. The method according to claim 36, characterized in that
a) a desired image that is visible when viewed and has one or more moiré image elements is defined,
b) an arrangement of microfocusing elements is chosen in the form of a two-dimensional Bravais lattice whose lattice cells are given by vectors $\vec{w}_1$ and $\vec{w}_2$.
c) a desired movement of the visible image when the moiré magnification arrangement is tilted laterally and when tilted forward and back is defined, the desired movement being specified in the form of the matrix elements of a transformation matrix $\vec{A}$, and
d) the motif image having the micromotif elements is calculated using the relationships $$\vec{U} = (\vec{I} - \vec{A}^{-1}) \cdot \vec{W}$$

and $$\vec{r} = \vec{A}^{-1} \cdot \vec{R} + \vec{r}_0,$$

$$\vec{R} = \begin{pmatrix} X \\ Y \end{pmatrix}$$

representing an image point of the desired image, $$\vec{r} = \begin{pmatrix} x \\ y \end{pmatrix}$$

an image point of the motif image, $$\vec{r}_0 = \begin{pmatrix} x_0 \\ y_0 \end{pmatrix}$$

a displacement between the arrangement of microfocusing elements and the arrangement of micromotif elements, and the matrices $\vec{A}$, $\vec{W}$ and the motif grating matrix $\vec{U}$ being given by $$\vec{A} = \begin{pmatrix} a_{11} & a_{12} \\ a_{21} & a_{22} \end{pmatrix}, \vec{W} = \begin{pmatrix} w_{11} & w_{12} \\ w_{21} & w_{22} \end{pmatrix} \text{ and } \vec{U} = \begin{pmatrix} u_{11} & u_{12} \\ u_{21} & u_{22} \end{pmatrix},$$

with $u_{1i}$, $u_{2i}$ and $w_{1i}$, $w_{2i}$, representing the components of the lattice cell vectors $\vec{u}_i$ and $\vec{w}_i$, where i=1,2.

41. The method according to claim 36, characterized in that
a) an arrangement of microfocusing elements is chosen in the form of a two-dimensional Bravais lattice whose lattice cells are given by vectors $\vec{w}_1$ and $\vec{w}_2$,
b) a predefined bending is defined for viewing in the case of a curved moiré magnification arrangement, the predefined bending being specified in the form of the matrix elements of the bending matrices for lens grids and motif grids $V_L$, $V_M$,
c) a desired movement and magnification behavior of the visible image is specified either prior to bending by a transformation matrix A or after bending by a transformation matrix A', and
d) the motif image having the micromotif elements is calculated using the relationships $$\vec{U} = \vec{W} - \vec{A}^{-1} \cdot \vec{W}$$

and $$A' = (I - V_M(I - A^{-1})V_L^{-1})^{-1} \text{ or}$$

$$A = (I - V_M^{-1}(I - A'^{-1})V_L)^{-1}.$$

42. The method according to claim 36, characterized in that the motif image and the arrangement of microfocusing elements are arranged at opposing surfaces of an optical spacing layer.

43. The method according to claim 36, characterized in that the arrangement of microfocusing elements is provided with a protective layer whose refractive index preferably differs from the refractive index of the microfocusing elements by at least 0.3.

44. The method according to claim 36, characterized in that the micromotif elements are printed on a substrate, preferably in the form of microcharacters or micropatterns.

45. The method according to claim 36, characterized in that the security element is further provided with an opaque cover layer to cover the moirémagnification arrangement in some regions.

46. The method according to claim 45, characterized in that the cover layer is applied in the form of patterns, characters or codes, and/or is provided with gaps in the form of patterns, characters or codes.

* * * * *